(12) United States Patent
Smith

(10) Patent No.: US 6,349,097 B1
(45) Date of Patent: *Feb. 19, 2002

(54) MULTICASTING IN SWITCHING APPARATUS

(75) Inventor: Graeme Roy Smith, Manchester (GB)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,252

(22) Filed: Jun. 5, 1997

(30) Foreign Application Priority Data

Aug. 14, 1996 (GB) ............................................. 9617100

(51) Int. Cl.$^7$ ............................................. H04L 12/28
(52) U.S. Cl. ..................... 370/390; 370/395; 370/413
(58) Field of Search .................. 370/389, 390, 370/392, 395, 398, 412, 415, 413

(56) References Cited

U.S. PATENT DOCUMENTS

| | | | | |
|---|---|---|---|---|
| 5,166,926 A | * | 11/1992 | Cisneros et al. | 370/395 |
| 5,237,565 A | | 8/1993 | Henrion et al. | 370/60.1 |
| 5,377,182 A | | 12/1994 | Monacos | 370/16 |
| 5,394,397 A | | 2/1995 | Yanagi et al. | 370/60.1 |
| 5,436,886 A | * | 7/1995 | McGill | 370/395 |
| 5,825,767 A | * | 10/1998 | Mizukoshi et al. | 370/395 |
| 5,872,769 A | * | 2/1999 | Caldara et al | 370/320 |
| 5,898,687 A | * | 4/1999 | Harriman et al. | 370/390 |

FOREIGN PATENT DOCUMENTS

| | | |
|---|---|---|
| EP | 0 668 681 | 8/1995 |
| EP | 0 680 173 | 11/1995 |
| EP | 0 687 124 | 12/1995 |
| EP | 0 702 500 | 3/1996 |
| EP | 0 710 047 | 5/1996 |
| GB | 2 165 125 | 4/1986 |
| GB | 2 300 786 | 11/1996 |

OTHER PUBLICATIONS

Marrakchi et al., "Circuit and Systems Letters—A Neural Net Arbitrator for Large Crossbar Packet–Switches," *IEEE Transactions on Circuits and Systems*, vol. 36, No. 7 Jul. 1989, pp. 1039–1041.

Dhas et al., "Broadband Switching Architectures, Protocols, Designs & Analysis," *IEEE Computer Society Press Book*, 1991, Chapter 1.1, pp. 108–109.

(List continued on next page.)

*Primary Examiner*—Chau T. Nguyen
*Assistant Examiner*—Phuongchau Ba Nguyen
(74) *Attorney, Agent, or Firm*—Staas & Halsey LLP

(57) ABSTRACT

A data unit receives data packets and delivers them to packet switching circuitry. The data unit stores the received data packets in a memory. The memory has receive queues ($RQ_0$ to $RQ_{63}$) corresponding respectively to the different possible intended destinations of the receive packets in the packet switching circuitry, and when each data packet is received, an entry corresponding to the packet concerned is made in that one of the receive queues (RQ) which corresponds to the intended destination of the packets. A multicast handling section operates, when such a received data packet is a multicast packet having two or more intended destinations, to cause the packet registration means to make an entry corresponding to the multicast packet concerned in each receive queue corresponding to one of those destinations. An output section operates, for each receive queue, to read the entries in the queue concerned in the order in which they were made and, for each entry read, to read out the corresponding data packet form the memory and output it to the packet switching circuitry. Such a data unit is suitable for use in ATM switching apparatus in which the data packets each comprise one or more ATM cells, and can ensure cell sequence integrity for multicast and unicast cells having the same destination. Self-routing cross-connect switching devices for use in such ATM switching apparatus are also disclosed.

26 Claims, 15 Drawing Sheets

OTHER PUBLICATIONS

Morris et al., "Neural Network Control of Communications Systems," *IEEE Transactions on Neural Networks*, vol. 5, No 4, Jul. 1994, pp. 639–650.

Park et al., "Applications of Neural Networks in High–Speed Communication Networks," *IEEE Communications Magazine*, Oct. 1995, pp. 68–74.

Reeve et al., "A Review of Non–Symbolic Artificial Intelligence Techniques for Network Management and Control," IEEE 13th UK Teletraffic Symposium, Strathclyde, Mar. 18–20, 1996, pp. 1/1–1/12.

* cited by examiner

US 6,349,097 B1

MULTICASTING IN SWITCHING APPARATUS

BACKGROUND OF THE INVENTION

1. Field of the Invention

The present invention relates to multicasting in switching apparatus for use, for example, in asynchronous transfer mode (ATM) networks. In particular the present invention relates to data units for use in such apparatus to implement multicasting.

2. Description of the Prior Art

FIG. 19 of the accompanying drawings shows parts of switching apparatus previously considered for use in an ATM network. The switching apparatus 1 includes sixty-four data units $2_0$ to $2_{63}$, each data unit having an input portion $4_0$ to $4_{63}$ and an output portion $6_0$ to $6_{63}$. For the sake of clarity only the input and output portions of the data units $2_0$, $2_1$, $2_2$ and $2_{63}$ are shown in FIG. 19. In FIG. 19, the output portion 6 of each data unit 2 is shown separately from the input portion 4 of the unit concerned, so as to clarify the operation of the apparatus, but it will be appreciated that both the input and output portions 4 and 6 form part of the same data unit 2.

Each data unit 2 is connected to one or more data input/output ports $DP_0$ to $DP_{127}$ of the switching apparatus; for example, as shown in FIG. 19, each data unit is connected to a pair of data ports DP.

The data ports DP of the FIG. 19 apparatus are connected to respective ATM communications lines, which typically each provide a large number of separate channels (virtual channels). Each ATM virtual channel carries data in the form of fixed-length cells.

The apparatus 1 further comprises a cross-connect switching unit 8 having as many input ports $IP_0$ to $IP_{63}$ and as many output ports $OP_0$ to $OP_{63}$ as there are data units 2. Each input portion 4 is connected to one of the input ports IP and each of the output portions 6 is connected to one of the output ports OP.

The cross-connect switching unit 8 is controllable selectively to provide connections between its input ports and its output ports. Up to 64 simultaneous connections, each between one of its input ports and one of its output ports, can be provided. For example, if data is received by the apparatus 1 at data port $DP_2$ (the "source" data port) that is to be routed to data port $DP_4$ (the "destination" data port), the cross-connect switching unit 8 is configured to provide a connection between the input portion $4_1$ of the data unit $2_1$ (the "source data unit" having the source data port $DP_2$ connected to it) to the output portion $6_2$ of the data unit $2_2$ (the "destination data unit") which has the destination data port $DP_4$ connected to it. Thus, the source data unit $2_1$ and the destination data unit $2_2$ form a data-unit pair and are allocated a data transfer path within the apparatus for use in passing data from the source data unit of the pair to the destination data unit of the pair. At the same time, up to 63 other such data-unit pairs can be allocated respective data transfer paths by the switching unit 8 to enable data received at source data ports connected with the respective source data units of those pairs also to be routed through the switch to the respective destination data units of the pairs, those destination data units being connected with the relevant destination data ports.

Since it is possible for two (or more) source data ports to wish to communicate at the same time to the same destination data port, it is normal to make provision for some buffering of the data at some point within the switching apparatus, either within the data units 2 or in the cross-connect switching unit 8, or possibly in both. This buffering holds up the data of one of the two contending source data ports pending transfer to the intended destination data port of the data received at the other of those two contending source data ports.

Of the virtual channels connected to the data ports, some channels are so-called "unicast" channels, the cells of which are to be switched by the apparatus to just a single other virtual channel. However, other channels connected to the data ports may be so-called "multicast" channels, the cells of which are to be switched by the apparatus to more than one other channel. Thus, to deal with cells received from such a multicast channel it is usually necessary to transfer the cells from the source data port to a plurality of destination data ports.

There are a number of ways in which provision can be made for such multicasting. For example, as described in more detail in our copending United Kingdom application no. 9617110.3, it is possible to operate the data units in "multicasting groups", each group having a source data unit which outputs one or more cells to all of the destination data units of the group at the same time. In order to avoid contention at the output ports of the switching unit, it will generally only be possible for one or a limited number of such multicasting groups to be formed at the same time. Thus, in this method the data units have to be allocated multicasting opportunities individually or in small groups in turn, for example at predetermined time intervals.

However, this multicasting method remains relatively inefficient, since it is complex to control and arrange, for example from the software point of view, and, being prone to cell contention problems, may lead to cell loss unless significant buffering is provided in the apparatus.

In addition, just as with unicast channels, multicast channels may be used to carry different types of data traffic. For example, some multicast channels may be used to carry low-priority computer data files, whereas other multicast channels may be used to carry high-priority constant-bit-rate (CBR) traffic such as voice and video. All ATM channels, including multicast channels, must meet the quality of service (QoS) requirements specified at the time the channel concerned is set up. In particular, cell delays and cell delay variations (CDV) must be within agreed limits commensurate with the specified QoS requirements. There may be unicast and multicast channels, passing through the switching apparatus to the same destination data port, that have the same priority (QoS requirements). The allocation of multicasting opportunities at predetermined time intervals can result in the multicast channels receiving priority in the switching apparatus so that a multicast cell destined for a particular data port and received after a unicast cell for that same destination data port is nonetheless transferred to the destination data port before the unicast cell, even though the two cells have the same priority.

In effect, therefore, the cell sequence integrity for different virtual channels of the same priority cannot be guaranteed. By tending to accord higher priority to multicast channels in the switching apparatus, cell delays for unicast channels can build up elsewhere in the network which must be strenuously avoided as cell delays and cell delay variation have serious degrading effects on real-time traffic such as voice and video traffic. Voice traffic, for example, may be truncated and unwanted signals and undesirable sound effects may be introduced. Video traffic is even more susceptible to such delay/phase variations which manifest themselves as dropped picture elements, colour changes and other visual anomalies.

It may also be desired to make the switching apparatus "self-routing" so that data passes along a suitable route through the various components of the apparatus without every component having to have its routing of the data controlled directly by the switching controller, thereby reducing the control burden on the switching controller. The need to perform multicasting complicates design of the switching apparatus components and accordingly it is desirable to provide a multicasting method for use in such apparatus having self-routing components, in particular a self-routing switching unit, without over-complicating the designs of those components.

BRIEF SUMMARY OF THE INVENTION

According to a first aspect of the present invention there is provided a data unit, for receiving data packets and delivering them to packet switching circuitry, including: packet storage means for causing the received data packets to be stored in memory means; packet registration means operable, when each data packet belonging to a predetermined first category of the data packets is received, to make an entry corresponding to the packet concerned in first register means and also operable, when each data packet belonging to a predetermined second category of the data packets is received, to make an entry corresponding to the packet concerned in second register means; multicast handling means operable, when such a received data packet is a multicast packet belonging to both the said first and second categories, to cause the packet registration means to make respective entries corresponding to the multicast packet concerned in both the first and second register means; and packet output means operable, for each of the said first and second register means, to read the entries in the register means concerned in the order in which they were made and, for each entry read, to read out the corresponding data packet from the memory means and output it.

In such a data unit, cell sequence integrity is ensured for unicast and multicast packets belonging to the same category, making it possible to meet reliably quality of service requirements for both unicast and multicast packets.

There may be further predetermined categories of the data packets in addition to the said first and second categories, in which case the data unit preferably has such register means for each different category of the data packets, and the said multicast handling means serve, when such a multicast packet is received, to cause the packet registration means to make such an entry corresponding to the packet concerned in the register means for each category to which the packet belongs.

Preferably, the received data packets are categorised according to their respective intended destinations after being output to the packet switching circuitry by the packet output means, and each said register means corresponds to a different such intended destination. For example, a plurality of the data units may be employed together in switching apparatus, with switching means (a switching fabric) interconnecting the units and serving to provide data transfer paths selectively between pairs of the data units. The intended destinations then correspond respectively to the different data units.

Each said register means preferably has a first-in first-out organisation, for example a queue. This makes it easy for the entries in the register means to be read in the order in which they were made, and hence increases speed and efficiency.

When the received data packet is a multicast packet, the packet storage means are preferably caused to store the multicast packet at a single location in the said memory means, and the said entry corresponding to the multicast packet, made by the packet registration means in the register means for each category to which the multicast packet belongs, includes a pointer to the said single location. This avoids the need to store a copy of the multicast packet for each of its intended destinations. Although an entry needs to be made in each appropriate register means, the entry has significantly less information than the packet itself, so that rapid registration of the packets is possible.

The said memory means and each said register means preferably form part of the same storage unit, for example a static RAM, which may be internal or external to the data unit itself. This avoids the need to provide many different memories. If the storage unit is external, its size can be chosen to suit the traffic requirements; heavy traffic applications will require a larger storage unit than low traffic applications. This affords flexibility and can help to control costs.

For each data packet that is a unicast packet belonging to just one of the said categories of data packets, the said entry corresponding to that unicast packet preferably includes at least some data of the packet itself. In other words, when the memory means and register means all form part of the same storage unit, there is no need for the entry corresponding to a unicast packet to be separate from the packet itself: they can both be made in a single "descriptor" placed in the relevant register means (queue) when the unicast cell is received.

The said packet storage means preferably organise the said storage unit in data blocks and include free pool means, for registering those data blocks of the storage unit that are free for use, the packet storage means being operable, when a data packet is received, to allocate the packet one of the said data blocks registered by the said free pool means as being free for use; the data block allocated to such a unicast packet being re-registered by the free pool means when the said entry corresponding to that packet (e.g. the descriptor mentioned above) has been read by the packet output means from the register means in which it was made.

The use of such data blocks in this way allows the memory resources to be allocated dynamically when the unit is in use, which avoids the need to reserve fixed amounts of memory for each register means and for the memory means in advance.

In this case, the said multicast handling means are preferably operable to inhibit the re-registration by the free pool means of a data block allocated to a multicast packet until each one of the said entries corresponding to that multicast packet has been read by the packet output means. For example, the data of the said multicast packet may be stored in a multicast descriptor in the data block allocated to the packet. This multicast descriptor preferably includes multicast processed bits corresponding respectively to the different categories of data packets. The said multicast handling means are operable, when such a multicast packet is received, to preset to a first state the multicast processed bits corresponding respectively to the categories to which the multicast packet concerned belongs, whilst presetting the remaining multicast processed bits to a second state different from the said first state, and are also operable, when the entry corresponding to the multicast packet in one of the register means is read by the output means, to change the multicast processed bit corresponding to that register means to the said second state, and to cause the data block allocated to the multicast packet to be returned to the said free pool upon detecting that all of the said multicast processed bits have the said second state. This permits convenient handling of multicast descriptors.

In one preferred embodiment, each said entry corresponding to a multicast packet is made in a link descriptor stored in one of the said data blocks, and the entries corresponding respectively to at least two successive multicast packets received between two successive unicast packets can be stored in the same link descriptor. This avoids the need to create a new descriptor in each appropriate register means each time a multicast packet is received. As the entry may be a simple pointer to the relevant multicast descriptor, many entries can be accommodated in a single link descriptor, saving memory, and the speed of making the entry is very high. Thus, it may be possible to update all the register means before the next packet is received, so avoiding the need for extra buffering or congestion control procedures.

The received data packets may be sub-categorised according to their respective priorities. In this case, the register means for at least one category are preferably sub-divided into a plurality of sub-register means corresponding respectively to the different priority-sub-categories, the packet registration means being operable, when a data packet belonging to the said one category is received, to make the said entry corresponding to the data packet in that one of the said sub-register means which corresponds to the priority-sub-category to which the packet concerned belongs. The packet output means are operable to select the sub-register means in priority order and, for each selected sub-register means, to output the data packets whose respective corresponding entries are in the sub-register means concerned in the order in which those entries were made. This can ensure that higher-priority packets are output in preference to lower-priority ones but still keeps the correct packet sequence as between unicast and multicast packets belonging to the same (main) category, e.g. having the same intended destination.

The said output means are operable to attach a routing tag to each data packet output thereby, which routing tag includes information identifying the said intended destination of the packet. This can enable the switching fabric components to be self-routing. In one embodiment, the output means are operable to attach to each data packet output thereby a routing tag including information identifying the said intended destination of the next data packet to be output thereby. This "feed-forward" method can permit a self-routing component to set its configuration for the next packet as soon as the previous packet has been dealt with, so potentially reducing buffering requirements in the component.

The routing tag may be of fixed length as every packet output by the output means—even one derived from a multicast received packet—has only one destination.

In one preferred embodiment the data unit is employed in ATM switching apparatus and the said data packets each comprise one or more ATM cells.

In this case, the said output means are preferably operable, when an entry corresponding to such a multicast packet is read from the register means corresponding to one of the said intended destinations of the packet, to include, in the header portion of the or each ATM cell of the packet output thereby, routing information corresponding to that intended destination. This enables the different output packets for the different destinations to have unique cell addresses.

In such ATM switching apparatus each data unit and the switching fabric components may operate asynchronously, but the data units and switching fabric components preferably operate synchronously to perform a series of switching cycles, and the apparatus preferably further comprises switching control means connected with the said data units for selecting the register means of each data unit from which one of the said entries is to be read by the output means of the unit concerned in each switching cycle. This can avoid contention problems in the apparatus and also enables the switching controller to allocate switching resources fairly, for example dynamically in dependence upon queue fill levels in the data units. The switching fabric components of such a synchronous switch may be essentially memory-less, for example a simple cross-connect switching unit may be used.

According to a second aspect of the present invention there is provided a method of multicasting data packets, for use in a data unit of packet switching apparatus, which method comprises: receiving data packets at the data unit and storing them in memory means; when each data packet belonging to a predetermined first category of the data packets is received, making an entry corresponding to the packet concerned in first register means and, when each data packet belonging to a predetermined second category of the data packets is received, making an entry corresponding to the packet concerned in second register means, and when such a received data packet is a multicast packet belonging to both the said first and second categories, making respective entries corresponding to the multicast packet concerned in both the first and second register means; and, for each of the said first and second register means, reading the entries in the register means concerned in the order in which they were made and, for each entry read, reading out the corresponding data packet from the memory means and outputting it from the data unit.

According to a third aspect of the present invention there is provided a cross-connect switching device, for switching data packets which include routing information, including: a plurality of ports; data transfer means selectively controllable to provide a plurality of data transfer paths at the same time, each path having an input port and an output port selected from the ports of the said plurality and serving to pass such a data packet received at its said input port to its said output port; and self-routing means operable, when such a data packet is received by the device at one of its said ports, to allocate the packet such a data transfer path having that port as its said input port and having as its said output port a further one of the ports selected by the self-routing means in dependence upon the said routing information.

In one embodiment, each said data packet includes routing information relating to that packet itself, but alternatively the data packet received at each port of the device may include routing information for the next data packet that is to be received by the port concerned, and the said self-routing means are operable to employ the routing information received with each data packet to allocate the data transfer path for the next data packet.

DETAILED DESCRIPTION OF THE PREFERRED EMBODIMENTS

Figure 1:
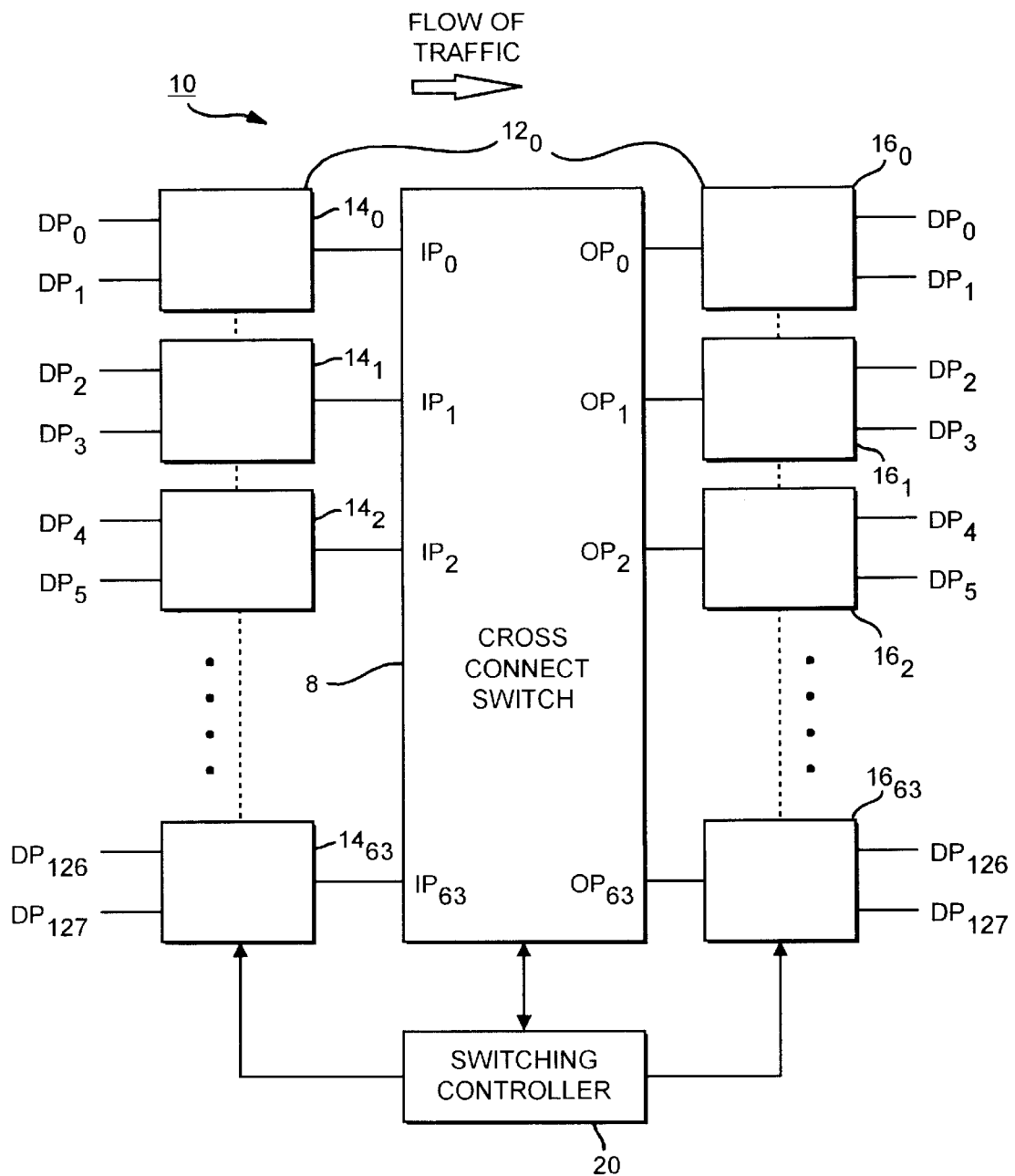
FIG. 1 shows a block diagram of ATM switching apparatus including data units embodying the present invention.

The switching apparatus 10 of FIG. 1 includes a plurality of data units $12_0$ to $12_{63}$ embodying the present invention and a cross-connect switching unit 8 interconnecting the data units.

Figure 19:
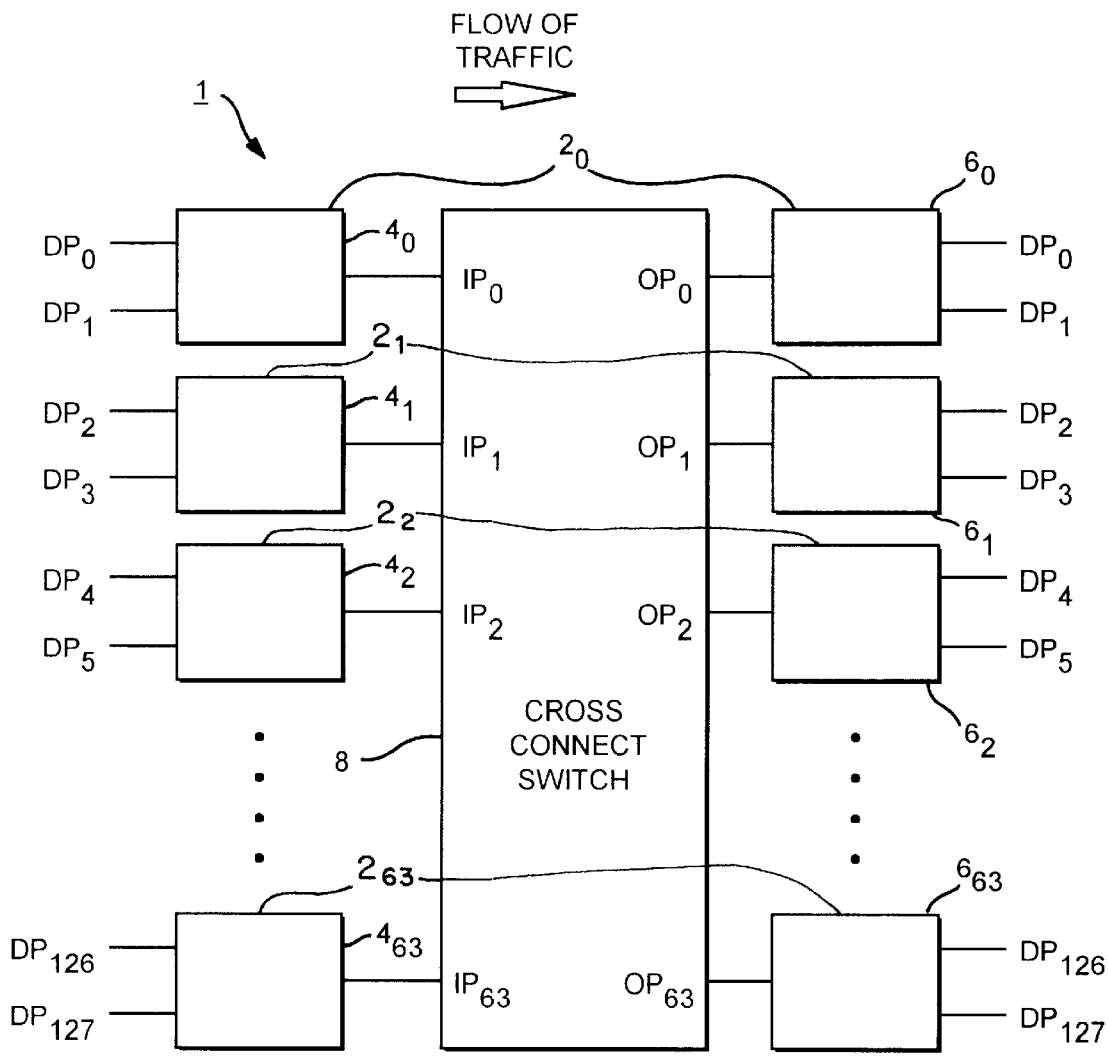
FIG. 19, discussed hereinbefore, shows a block diagram of previously-considered ATM switching apparatus.

Each data unit 12 of FIG. 1 has an input portion 14 in place of the input portion 4 of the FIG. 19 data unit 2 and an output portion 16 in place of the output portion 6.

As described previously with reference to FIG. 19, up to 64 data-unit pairs can exchange data simultaneously through respective transfer paths provided by the cross-connect switching unit 8. However, to avoid data contention problems, in a preferred embodiment of the present invention, the data units 12 and the switching unit 8 in FIG. 1 are operated synchronously in a series of switching cycles. Each switching cycle should be sufficiently long for the source data of each data-unit-pair to transfer at least one cell of ATM data to the destination data unit of the pair. The switching cycles do not all need to be of the same duration, however. For example, depending upon the traffic conditions, long switching cycles, sufficient to transmit tens of ATM cells, could be used at certain times, whereas at other times short switching cycles, sufficient only to transmit a single ATM cell through the apparatus, could be used.

Also, the switching apparatus shown in FIG. 1 further comprises a switching controller 20 which is connected to all of the data units $12_0$ to $12_{63}$ and also to the cross-connect switching unit 8. The switching controller 20 controls the data units 12 and the switching unit 8 to establish the required connections between the data ports dynamically when the apparatus is in use.

Figure 2:
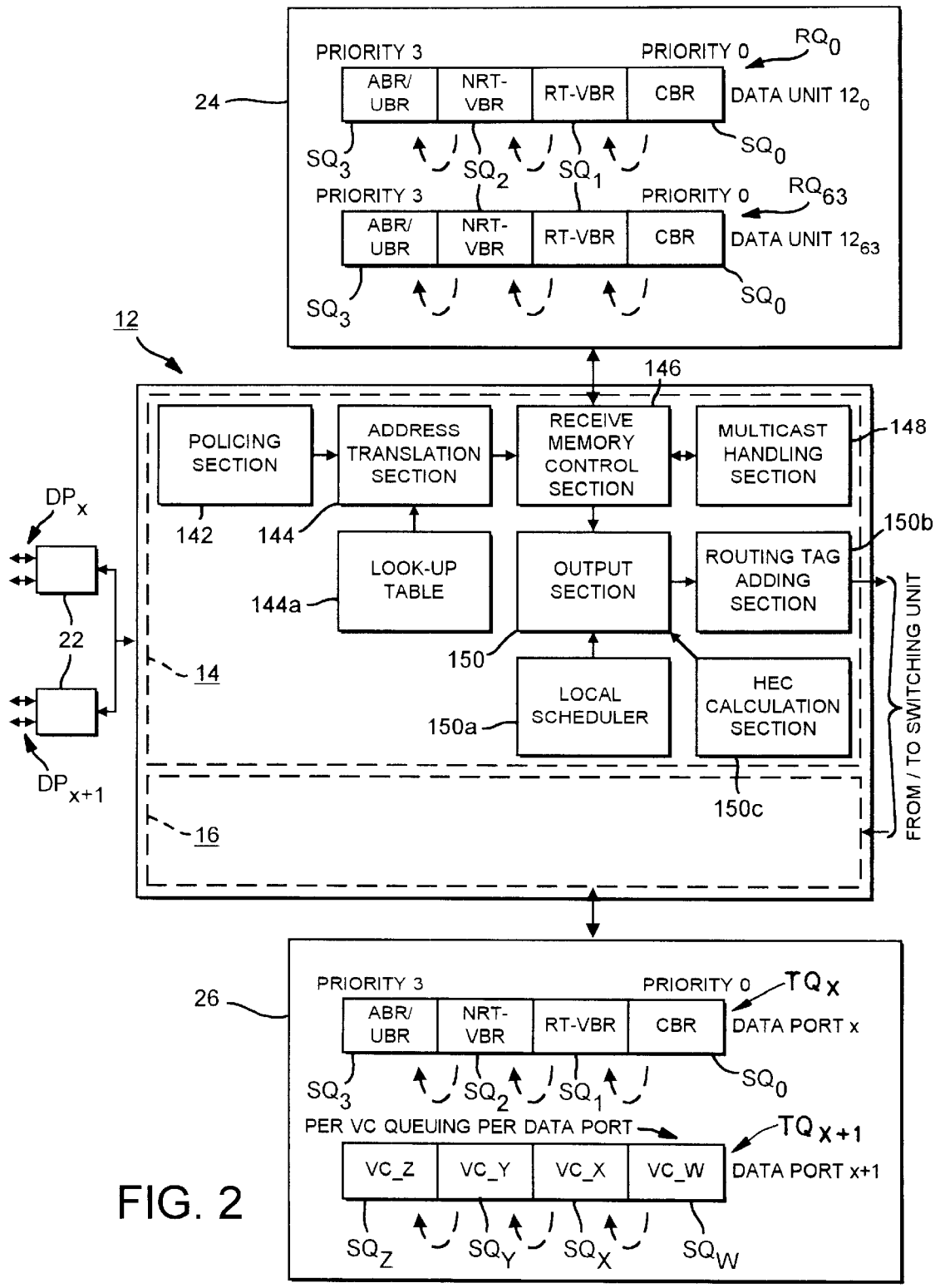
FIG. 2 is a schematic diagram showing parts of one of the data units in the FIG. 1 apparatus.

FIG. 2 shows parts of one of the data units 12 of FIG. 1.

Like each data unit 2 in FIG. 19, the data unit 12 has two associated data ports $DP_x$ and $DP_{x+1}$.

It will be appreciated that the data unit 12 of FIG. 2 could have just one data port connected to it, or could have more than two data ports connected to it. Furthermore, it is not necessary for each data unit 12 to have the same number of data ports connected to it.

Each data port is preferably a user-network-interface (UNI) port. ATM cells are received at the data ports $DP_x$ and $DP_{x+1}$ from ATM channels (virtual channels) connected with those data ports. These ATM channels may be constant bit rate (CBR), variable bit rate (VBR), available bit rate (ABR) or unspecified bit rate (UBR) channels. The VBR channels can be real-time variable bit rate (RT-VBR) channels and/or non-real-time variable bit rate (NRT-VBR) channels. Even for the CBR and VBR channels the arrival times of ATM cells belonging to the channel concerned at the data unit 12 are unpredictable, being subject to the vagaries (especially variable delays) of the ATM network providing the channel concerned.

Each received ATM cell carries in its header portion routing information (cell address, made up of a virtual path identifier (VPI) and virtual channel identifier (VCI)) for use by the data unit 12 to determine to which destination data port the cell concerned should be routed.

Each data port $DP_x$ and $DP_{x+1}$ is connected via a termination unit 22 to the data unit 12. Cells arriving at each of the data ports $DP_x$ and $DP_{x+1}$ are deframed, synchronised and error-checked by the termination units 22. The termination units 22 transfer valid cells to the data unit 12. In the data unit 12 the cells are "policed" by a policing section 142 (optional) of the input portion 14 to determine whether they are in accordance with previously-agreed traffic parameters for the ATM channel to which the cell concerned belongs.

The input portion 14 also has an address translation section 144 including a look-up table 144a which registers, for each of the different receive channels connected to the data ports $DP_x$ and $DP_{x+1}$, a corresponding destination data unit to which cells of that receive channel should be transferred. The routing information (cell address) carried by each received cell is employed to define the address in the look-up table 144a at which the identity of the destination data unit corresponding to that cell address is registered.

After its destination data unit is identified in this way the received cell is then passed to a receive memory control section 146 which is connected to a receive memory 24, for example a static RAM device, which in this embodiment is external to the data unit 12 but could alternatively be included in the data unit 12 itself. Incidentally, in FIG. 2 the look-up table 144a is shown as being internal to the input portion 14, but alternatively the look-up table 144a can be stored in the receive memory 24 which is external to the input portion.

In the receive memory 24 the received cells are stored in different queues according to the different destination data units to which they are to be transferred. Thus, when, as shown in FIG. 1, there are 64 data units $12_0$ to $12_{63}$ in the switching apparatus, as shown in FIG. 2 the receive memory 24 provides 64 main receive queues $RQ_0$ to $RQ_{63}$ corresponding respectively to the different possible destination data units $12_0$ to $12_{63}$. In addition, it is preferable, as shown in FIG. 2, to divide up each of the main queues $RQ_0$ to $RQ_{63}$ into a plurality of sub-queues $SQ_0$ to $SQ_3$, corresponding respectively to the different levels of priority of the cells. For example, cells belonging to constant-bit-rate channels have the highest priority (priority 0) and are accordingly stored in the highest-priority sub-queue $SQ_0$ of the relevant main queue. Cells belonging to real-time variable bit rate channels have the next-highest priority (priority 1) and these are stored in the next-highest priority sub-queue $SQ_1$ of the relevant main queue. Cells belonging to non-real-time variable bit rate and available bit rate/unspecified bit rate channels are stored in further, lower-priority sub-queues $SQ_2$ and $SQ_3$ of the relevant main queue. It is not essential to separate the cells into sub-queues according to priority; a single main receive queue RQ for each destination data unit may be sufficient in certain circumstances. In addition, the number of different priority levels is not limited to four, as shown in FIG. 2. There could be up to 64 different priority levels, for example.

Figure 3:
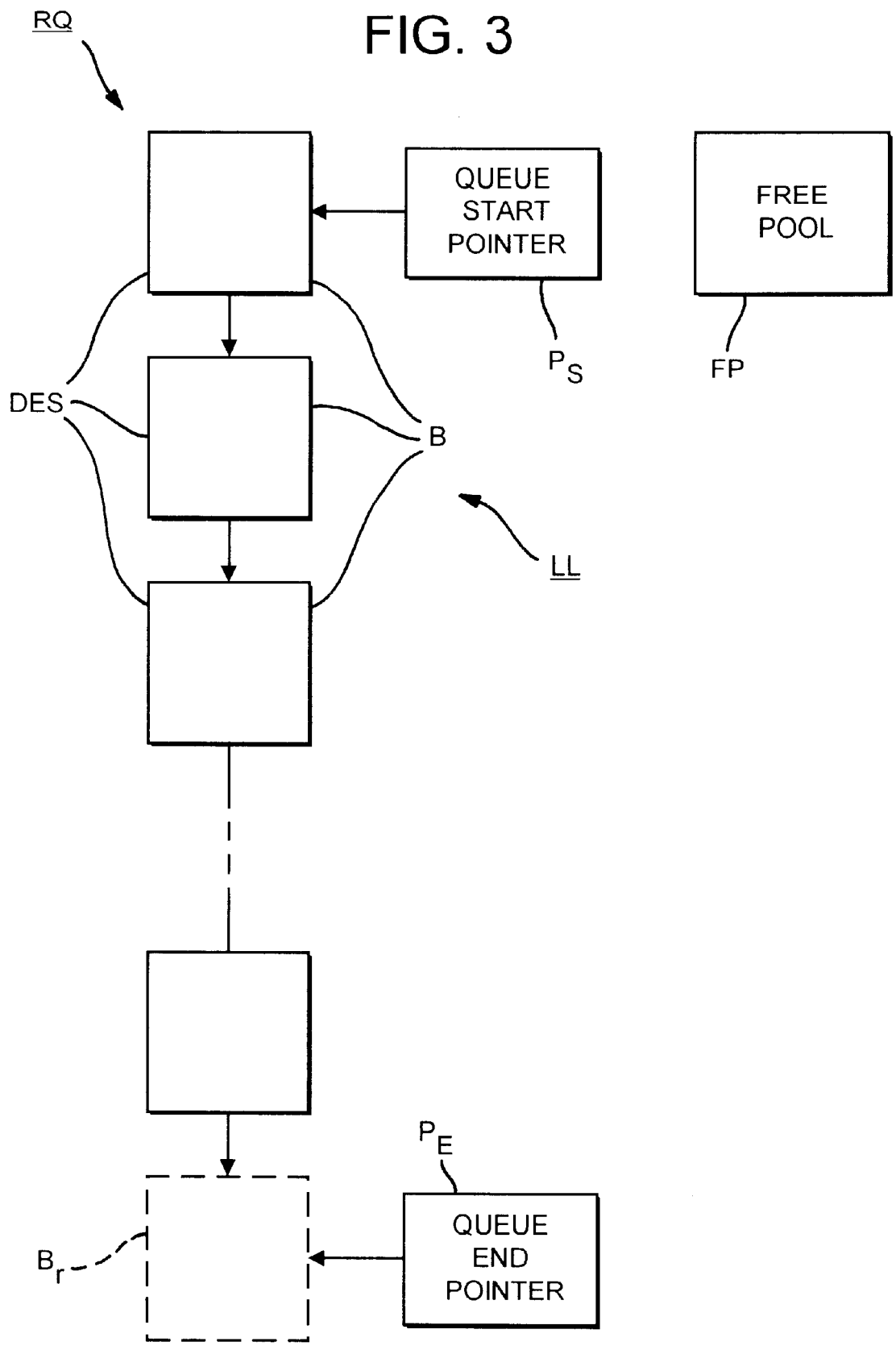
FIG. 3 shows a schematic diagram for illustrating storage of ATM cells in respective descriptors in the FIG. 2 data unit.

The receive memory 24 is divided up into a plurality of data blocks, each of which is used to store a "descriptor". The data blocks are allocated to the different receive queues RQ (and also, if used, to the sub-queues $SQ_0$ to $SQ_3$ within each main receive queue RQ) dynamically during operation of the data unit, because the queue sizes cannot easily be predicted in advance and therefore it would be wasteful of memory resources to allocate fixed amounts of memory to each of the queues. Referring now to FIG. 3, which shows schematically the organisation of one such queue, the addresses of data blocks B that are free for use (not already storing a descriptor) are held in a so-called free pool FP. When in use, the data blocks belonging to each queue (or sub-queue) are linked together in the form of a linked list LL. The receive memory control section 146 maintains pointers, including pointers $P_S$ and $P_E$ to the first and the last descriptor DES in each receive queue (or sub-queue), for use in managing the linked lists.

Figure 4A:
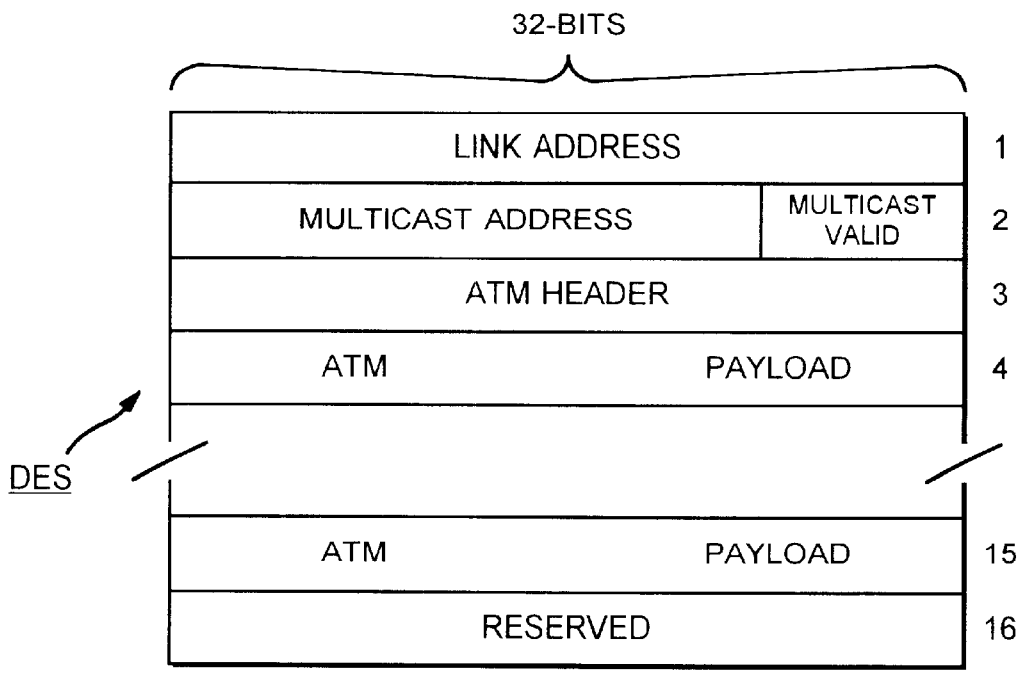
FIG. 4(A) shows a schematic diagram illustrating the format of a first type of descriptor employed in a first embodiment of the present invention to store a unicast cell.

FIG. 4(A) shows one example of the format of a descriptor in one of the receive queues RQ. The descriptor comprises 16 32-bit words. The first word stores a link address which is the address in the receive memory 24 of the next descriptor in the queue concerned. The second word is reserved for use in multicast situations, and will be described in more detail hereinafter.

The following thirteen words of the descriptor are used to store the ATM cell itself (header and payload) when the cell is a unicast cell. The last two words are reserved (not used) in this embodiment. In this embodiment, only the first four bytes of the header are stored in the descriptor, the fifth byte of the header, which is a header error check (HEC) byte, not being stored to reduce the number of memory accesses required. As explained later, the HEC byte can be regenerated when the cell is sent out to the switching fabric. Alternatively, however, the HEC byte received with a unicast cell could be stored at some suitable free location in the descriptor, for example in one of the last two words, or in an unused byte of the first word (the link address does not require all 32 bits).

Figure 4B:
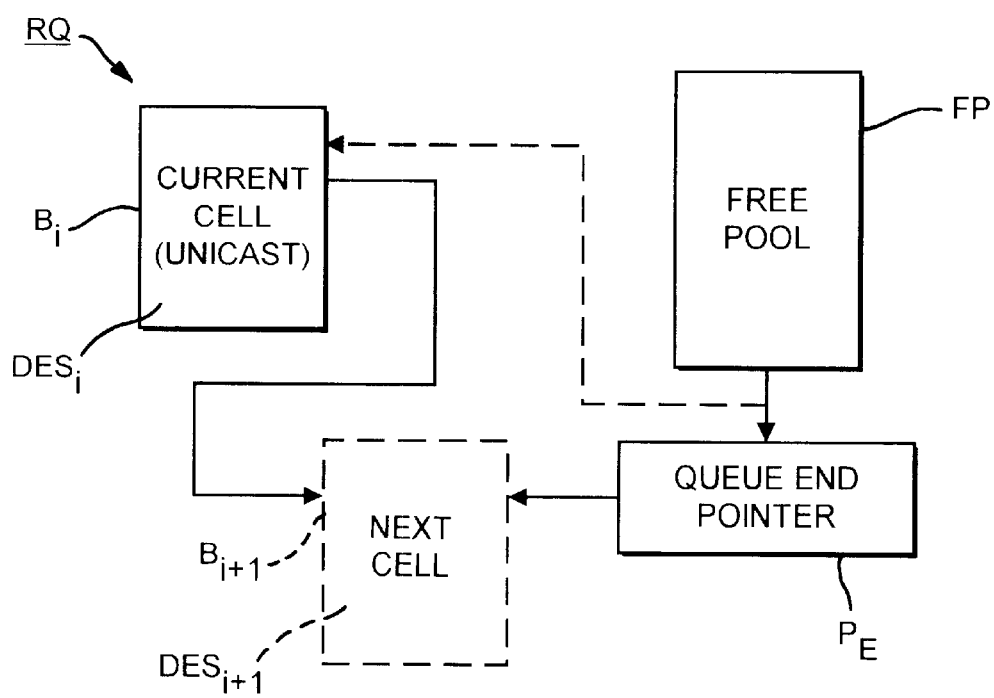
FIG. 4(B) shows a schematic diagram for illustrating an operation of creating a descriptor.

FIG. 4(B) shows the process of creating of a new descriptor in response to receipt by the input portion 14 of a unicast cell. Firstly, the unicast cell is stored, in the FIG. 4(A) format, in a descriptor $DES_i$ in a data block $B_i$ the address of which is taken from the queue end pointer $P_E$ for the receive queue RQ concerned. Then, a new data block $B_{i+1}$ is reserved in advance for the descriptor $DES_{i+1}$ needed to store the next cell to be placed in the receive queue, the address of the block $B_{i+1}$ being taken from the free pool FP and being stored in the link address field of the data block $B_i$ and in the queue end pointer $P_E$.

In this way, each unicast ATM cell received at one of the data ports $DP_x$ and $DP_{x+1}$ is stored by the input portion 14 of the data unit 12 in the receive memory 24 in that one of the receive queues $RQ_0$ to $RQ_{63}$ which corresponds to the destination data unit. However, whereas a received unicast cell has only a single destination data unit, a received multicast cell is required to be routed to a group of destination data units.

Figure 5:
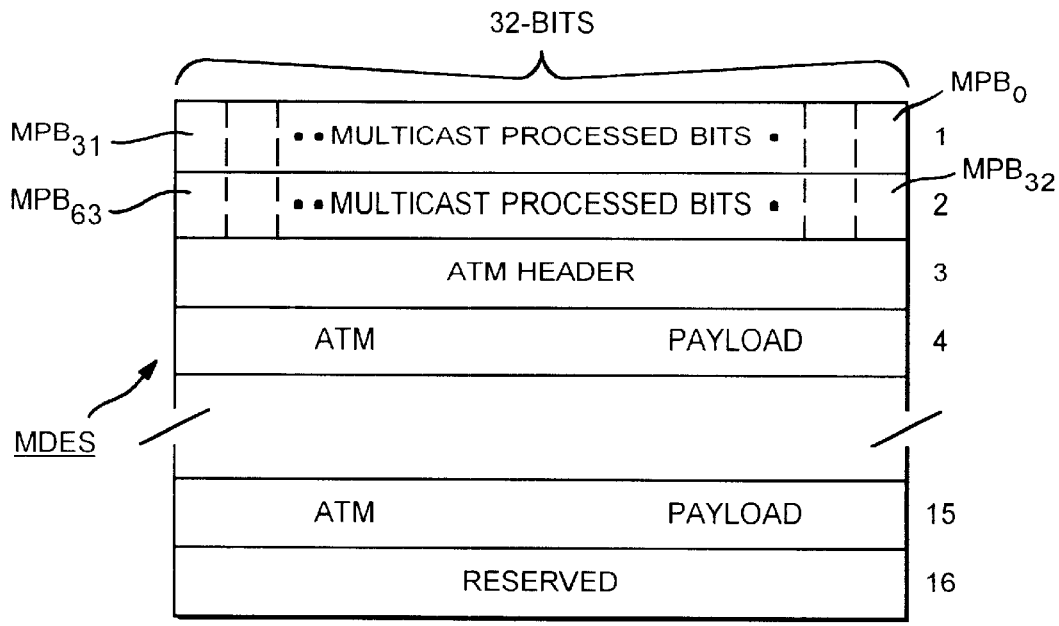
FIG. 5 shows a schematic diagram illustrating the format of a second type of descriptor employed in the first embodiment to store a multicast cell.

Multicast cells therefore need to be handled differently from unicast cells and, to this end, the input portion 14 includes a multicast handling section 148. When the received cell is a multicast cell, it is not stored many times over in each relevant destination data unit queue, but is instead stored only once, in its own multicast descriptor MDES, the format of which is shown in FIG. 5. This descriptor is also made up of sixteen 32-bit words. Thus, the data blocks used for storing multicast descriptors are of the same size as those used for the receive queue descriptors of FIG. 4(A), which simplifies memory control.

As shown in FIG. 5, the first two words of the multicast descriptor MDES are used to store 64 multicast processed bits $MPB_0$ to $MPB_{63}$ corresponding respectively to the different possible destination data units $12_0$ to $12_{63}$. The purpose of these bits will be explained hereinafter. The following 13 words of the multicast descriptor are used to store the multicast cell (header and payload) itself, and the last word is reserved (not used) in this embodiment.

In addition to creating a multicast descriptor for the multicast cell, it is also required to make an entry in the receive queue of each destination data unit to indicate that the multicast cell concerned is to be sent to that destination data unit. In this embodiment, the receive queue descriptors of FIG. 4(A) are also used to make such entries, and the entry is made in the last descriptor of each relevant receive queue when a multicast cell is received, and a new descriptor is added to each relevant receive queue (reserved for the next cell) as described previously with reference to FIG. 4(B).

Handling of received cells using the descriptors shown in FIGS. 4(A) and 5 will now be explained in detail. As described previously, when a cell is received by the input portion 14 of the data unit 12 it is optionally policed by the policing section 142 to determine whether it is in accordance with the traffic parameters previously agreed for the ATM channel to which it belongs. The cell is then processed by the address translation section 144 to determine its destination data unit or units. If the cell is a unicast cell it is stored in the third to fifteenth words of the last descriptor in the relevant receive queue using the process described with reference to FIG. 4(B). The multicast valid bit (in the second word of the descriptor) is reset to indicate that the cell stored in the descriptor is a unicast cell. A new descriptor is then reserved for the next cell, as described with reference to FIG. 4(B). This completes the processing for storing a unicast cell.

If the cell is a multicast cell, on the other hand, the multicast handling section 148 causes the cell to be stored in a multicast descriptor MDES having the format shown in FIG. 5(B), the address of which multicast descriptor is obtained from the free pool FP (FIG. 3). The multicast processed bits $MPB_0$ to $MPB_{63}$ (in the first two words of the multicast descriptor) corresponding respectively to the destination data units of the multicast cell are then set, the remaining multicast processed bits being reset. For example, if a received multicast cell is destined for data units $12_0$, $12_2$ and $12_5$, then the corresponding multicast processed bits $MPB_0$, $MPB_2$ and $MPB_5$ are set.

The multicast handling section 148 then makes an entry in the last descriptor in the receive queue for each destination data unit to which the multicast cell is to be sent. Thus, in the example given above, entries are made in the last descriptors of the receive queues $RQ_0$, $RQ_2$ and $RQ_5$ corresponding respectively to the destination data units $12_0$, $12_2$ and $12_5$. Each of these last descriptors also has the format shown in FIG. 4(A), but in this case the data (payload) of the ATM cell is not stored in the descriptor. Instead, the start address of the multicast descriptor MDES in which the multicast cell data has been stored is entered into the multicast address field (in the second word) of the last descriptor in each relevant receive queue. The multicast valid bit in the descriptor is also set to indicate that a multicast cell is stored at the specified multicast address.

The cell header is also stored in the third word of the last descriptor, but in this case it is stored with a replacement cell address (VPI and VCI fields), because the multicast cell needs to have a different cell address for each of its designated destination units. The different replacement cell addresses for the different destination units are held by the multicast handling section 148, having been registered as part of the call admission control procedure of the data unit 12 when the multicast channel was set up. In this embodiment the HEC byte is not stored but, if it were to be stored, the change in the cell address would make it necessary to recalculate the HEC byte.

Finally, a new descriptor is reserved in each relevant receive queue for the next cell to be stored in that queue, as described with reference to FIG. 4(B). This completes the storage procedure for a multicast cell.

Unicast and multicast cells received at the data ports $DP_x$ and $DP_{x+1}$ are stored in this way in the relevant receive queues. These cells are then read from the queues and output by an output section 150 of the data-unit input portion 14 to the switching fabric (e.g. the switching unit 8 in FIG. 1) for transfer to their respective destination data units. The output section 150 operates in parallel with the receiving sections 142 and 144 of the input portion 14 so that the output section can read and output cells from the receive queues whilst new cells are received, processed and stored in those queues by the receiving sections 142 and 144.

In this embodiment, the switching apparatus as a whole operates synchronously in a series of switching cycles, and the output section 150 has a local scheduler 150a which registers control information, supplied to the data unit 12 concerned by an external switching controller (e.g. the switching controller 20 in FIG. 1), for use in determining which receive queue (and sub-queue, if used) is permitted to transfer data to the switching fabric in each switching cycle.

Also, in this embodiment, the output section 150 has a routing tag section 150b which is operable to attach to each cell output to the switching fabric a routing tag which can be employed by the switching fabric components (e.g. the switching unit 8 in FIG. 1) to determine the route of the cell concerned through those components, as described later in more detail with reference to FIGS. 15 to 17.

Figure 6:
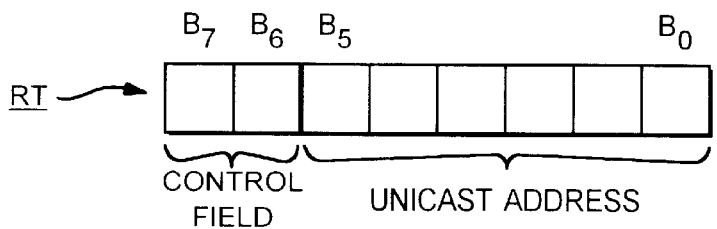
FIG. 6 shows a schematic diagram for illustrating the format of a routing tag applied by the FIG. 2 data unit.

FIG. 6 shows an example of the format of the routing tag. In this case, the tag is a single byte in length and is attached to the start of the cell to which it relates, i.e. the routing tag byte is the first byte and is followed by the bytes of the cell itself. The routing tag has an address field, made up of the six lower-order bits $B_0$ to $B_5$, and a control field made up of the two highest-order bits $B_6$ and $B_7$. The six bits of the address field enable up to 64 different destination data units to be specified. The control field is used to identify the start of a data packet (i.e. routing tag byte and cell bytes) output by the data unit 12.

The output section 150 in this embodiment also has an HEC calculation section 150c which calculates the HEC byte for inclusion in the header of each cell to be output to the switching fabric based on the first four bytes of the header as stored in the relevant descriptor (third word in the FIG. 4(A) descriptor).

When the main receive queues $RQ_0$ to $RQ_{63}$ corresponding respectively to the different destination data units $2_0$ to $2_{63}$ are subdivided into sub-queues SQ according to priority as shown in FIG. 2, the sub-queues of each main queue RQ are basically processed in turn by the output section 150, starting from the highest-priority sub-queue $SQ_0$. Within each sub-queue the descriptors are read in the order in which they were stored in the sub-queue concerned so that at each priority level cells received at the data ports are transferred to the switching fabric on a first-in first-out basis. If, during processing of a lower-priority sub-queue, a new descriptor is stored in a higher-priority queue, processing of the lower-priority queue is suspended on completion of transfer of the current descriptor in that sub-queue, pending transfer of the new higher-priority descriptor.

When the output section 150 reads from a receive queue RQ a descriptor in which the multicast valid bit is set, it reads the multicast descriptor start address (in the second word of the descriptor) and then reads the multicast cell data from the third to fifteenth words of multicast descriptor MDES at the specified start address, and reads the cell header, including required replacement cell address, from the third word of the receive-queue descriptor. The HEC calculation unit 150c calculates the HEC byte for the multicast cell to reflect the replacement cell address. The routing tag section 150b identifies the destination data unit from the number of the particular receive queue RQ from which the descriptor was read. The multicast cell data and its corresponding header (including the replacement cell address and calculated HEC byte) are output, with the routing tag attached, to the switching fabric as a data packet.

The output section 150 also informs the multicast handling section 148 that a multicast cell is being output. The multicast handling section 148 then resets that one of the multicast processed bits $MPB_0$ to $MPB_{63}$ (in the first two words of the multicast descriptor MDES) which corresponds to the present destination data unit. If all of the multicast processed bits are now reset, this indicates that this is the last receive-queue descriptor which relates to the presently-processed multicast cell. Because the multicast cell has now been sent to all of the required destination data units, the multicast descriptor MDES is no longer needed and the start address of its data block is returned to the free pool.

If, on the other hand, the multicast handling section 148 finds that any of the multicast processed bits in the multicast descriptor is still set, the multicast descriptor is still needed to send the multicast cell to another destination data unit, and accordingly the multicast descriptor must remain in use.

In this method of implementing multicasting, the correct cell order (first-in first-out order) for each destination data unit is guaranteed, because when a multicast cell is received an entry relating to it is placed in the correct position in the receive queue for each of its destination data units. This avoids the "queue-jumping" problem, discussed in the introduction, of the previously-considered multicasting method involving allocating the data units multicasting opportunities at predetermined times in which, when multicast cells and unicast cells of the same priority are received at the same source data unit and are destined for the same destination data unit, the multicast cell is transferred before the unicast cell to the destination data unit even though the unicast cell was received first.

Figure 7:
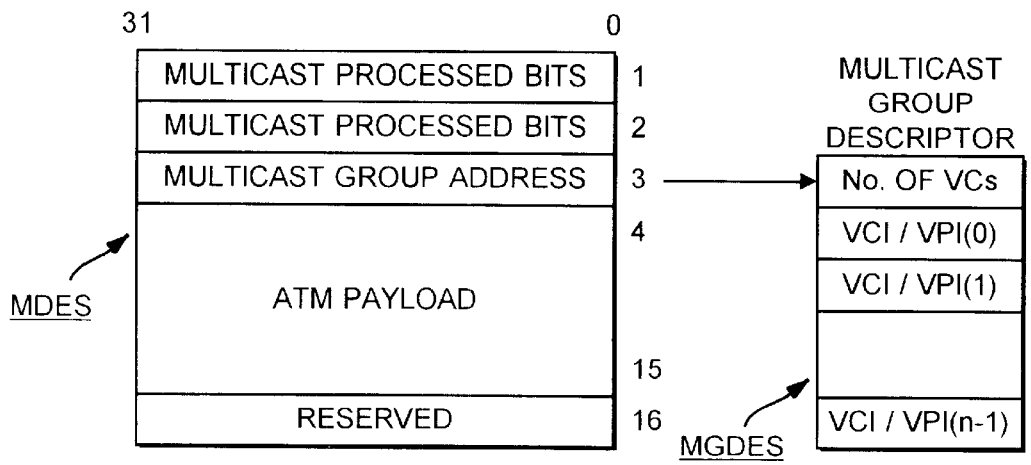
FIG. 7 shows a schematic diagram for illustrating a modified form of the second type of descriptor shown in FIG. 5.

Instead of using the receive-queue descriptors to store the replacement cell addresses, it is possible to effectively attach a cell address look-up table, containing all the different cell addresses required for the destination data units of a multicast cell, to the multicast descriptor MDES. This approach is shown in FIG. 7, in which the third word of the multicast descriptor (which, in the FIG. 5 multicast descriptor format, was effectively redundant) is used to store a pointer to the start address in the receive memory 24 of a multicast group descriptor MGDES storing the cell address look-up table together with a word indicating the length of the table. This look-up table contains a list of replacement cell addresses (ATM replacement headers), the entries in the list corresponding respectively to the different data units. The entry corresponding to each data unit stores the replacement cell address to be used with the cell data for that data unit. If the multicast cell is not destined for a particular data unit, then the entry corresponding to that data unit is left blank.

When a receive-queue descriptor relating to a multicast cell is processed, the multicast descriptor MDES is read as described previously but in this case the cell address required for the particular destination unit is retrieved by the output section 150 from the multicast group descriptor MGDES using the number of the destination data unit to address the look-up table.

In the above-described first embodiment, when a multicast cell is received by the data unit 12 the multicast handling section 148 has to write the multicast control data (comprising the multicast descriptor start address, the multicast valid bit and the cell address) in the last descriptor at the end of the receive queue for each destination data unit, in addition to writing the new multicast descriptor. The number of memory access operations required is reduced by having the receive memory control section 146 store internally the pointers $P_S$ and $P_E$ to the start and end of the receive queues. However, an input buffer (FIFO) will be required at the input portion 14 to buffer the received cells if the multicast handling section 148 takes longer than a cell period to store the multicast descriptor itself and the multicast control data in each receive-queue descriptor. The number of receive-queue descriptors required depends upon the number of destination data units of the multicast cell. Thus, the number of descriptor updates can vary. If there is congestion in the input buffer (FIFO) then backward-direction cells of the ATM channel to which the multicast cell belongs can have their congestion bits set so that the data source for that channel can reduce its cell rate until the congestion is alleviated.

A second embodiment of the present invention will now be described which can reduce the number of memory access operations as compared with the first embodiment described above with reference to FIG. 4(A). The second embodiment also stores each multicast cell in its own multicast descriptor having the format shown in FIG. 5. Furthermore, the address of this multicast descriptor is then stored in a descriptor in each relevant receive queue RQ, as described previously.

Figure 8:
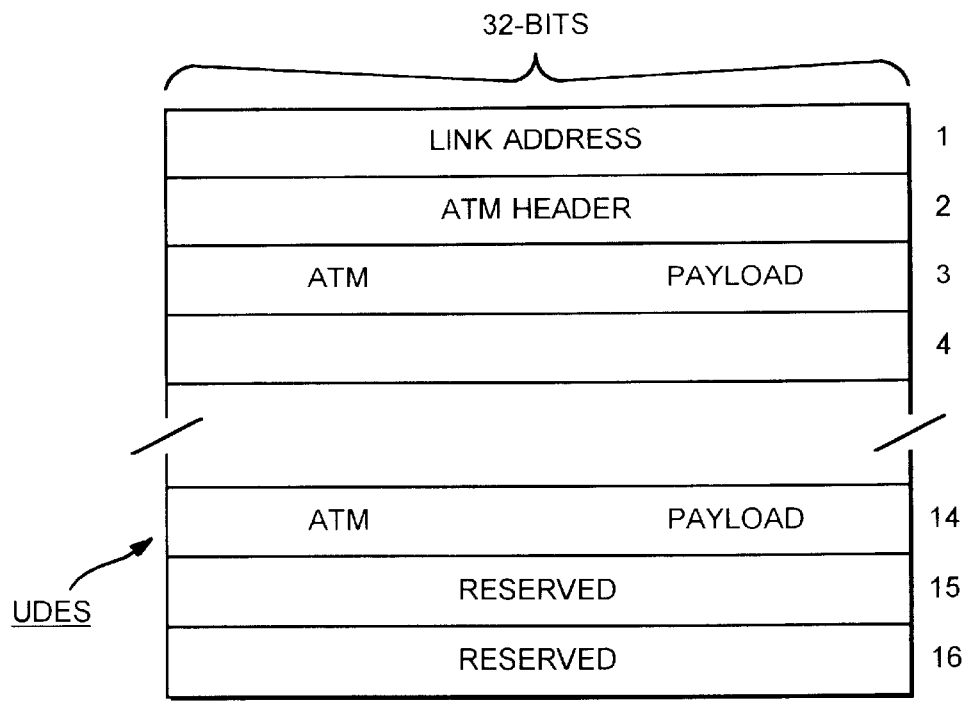
FIG. 8 shows a schematic diagram for illustrating the format of a first type of descriptor employed in a second embodiment of the present invention to store a unicast cell.

However, as shown in FIG. 8, in this embodiment two different types of descriptor can be stored in the receive queues, unlike in the first embodiment which stored only one type of descriptor in the receive queues as shown in FIG. 4(A).

The first type of descriptor, shown in FIG. 8, is a unicast descriptor UDES used to store a unicast cell, and in this case, the header of the cell is stored in the second word and the payload of the cell is stored in the third to fourteenth words, as shown in FIG. 8 itself. The final two words of the descriptor are not used. As usual, the first word stores a link address to the next descriptor in the receive queue concerned.

Operation of this embodiment in relation to unicast cells is the same as that described previously with reference to FIG. 4(B). Thus, when the unicast cell is received, it is stored (in the FIG. 8 format) in the last descriptor of the receive queue, which descriptor is pointed to by the queue end pointer $P_E$. Then, a new data block ($B_{i+1}$ in FIG. 4(B)) is reserved for the next cell in that receive queue, the address of the reserved data block being taken from the free pool FP and the link address of the preceding descriptor (i.e. the descriptor in which the unicast cell has just been stored) is set to the address of the reserved data block, as is the queue end pointer $P_E$.

Figure 9:
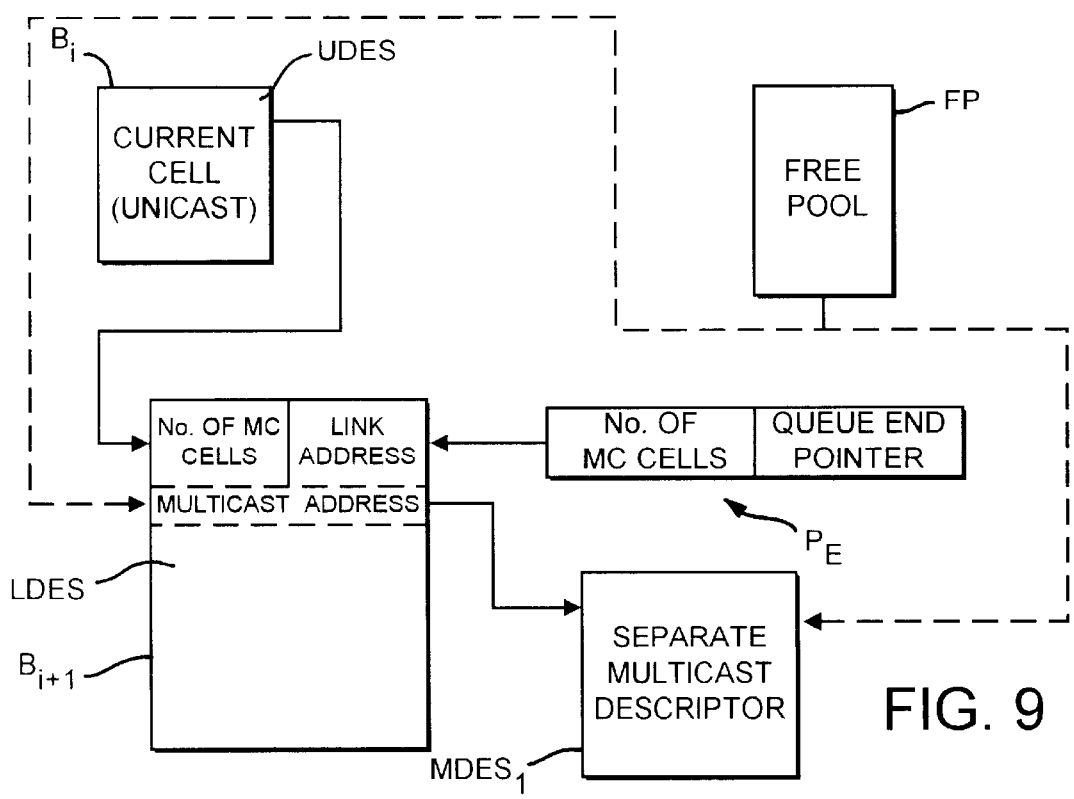
FIGS. 9 to 12 show schematic diagrams for illustrating operations performed in the second embodiment.

Referring now to FIG. 9, when a multicast cell is received by the data unit 12 in this embodiment, it is stored in its own separate multicast descriptor $MDES_1$ which has the same format as the multicast descriptor shown in FIG. 5. In this case, however, in place of the unicast descriptor UDES shown in FIG. 8, a link descriptor LDES is stored in the reserved data block $B_{i+1}$. In this case, no new data block is reserved for the next entry in the queue, for reasons that will become apparent hereinafter. No access to the data block $B_i$ storing the last-received unicast cell is required because the link address in the descriptor stored in that data block $B_i$ already points to the data block $B_{i+1}$ used to store the link descriptor LDES. Similarly, the queue end pointer $P_E$ already stores the address of the link descriptor LDES and so does not need to be updated in this respect. However, as shown in FIG. 9, in this embodiment the queue end pointer $P_E$ also has a "number of multicast cells" field and this field is set to the value 1, indicating that, so far, the link descriptor LDES currently pointed to by the queue end pointer $P_E$ has just one associated multicast descriptor $MDES_1$.

The first word of the link descriptor LDES is used to provide the link descriptor LDES with a "number of multicast cells" field and a "link address" field, the purpose of which will be explained later. The remaining fifteen words of the link descriptor LDES are used to provide up to fifteen "multicast address" fields. In the state shown in FIG. 9, in which there is only one associated multicast descriptor $MDES_1$, only the first "multicast address" field is in use and stores the address of the multicast descriptor $MDES_1$.

Figure 10:
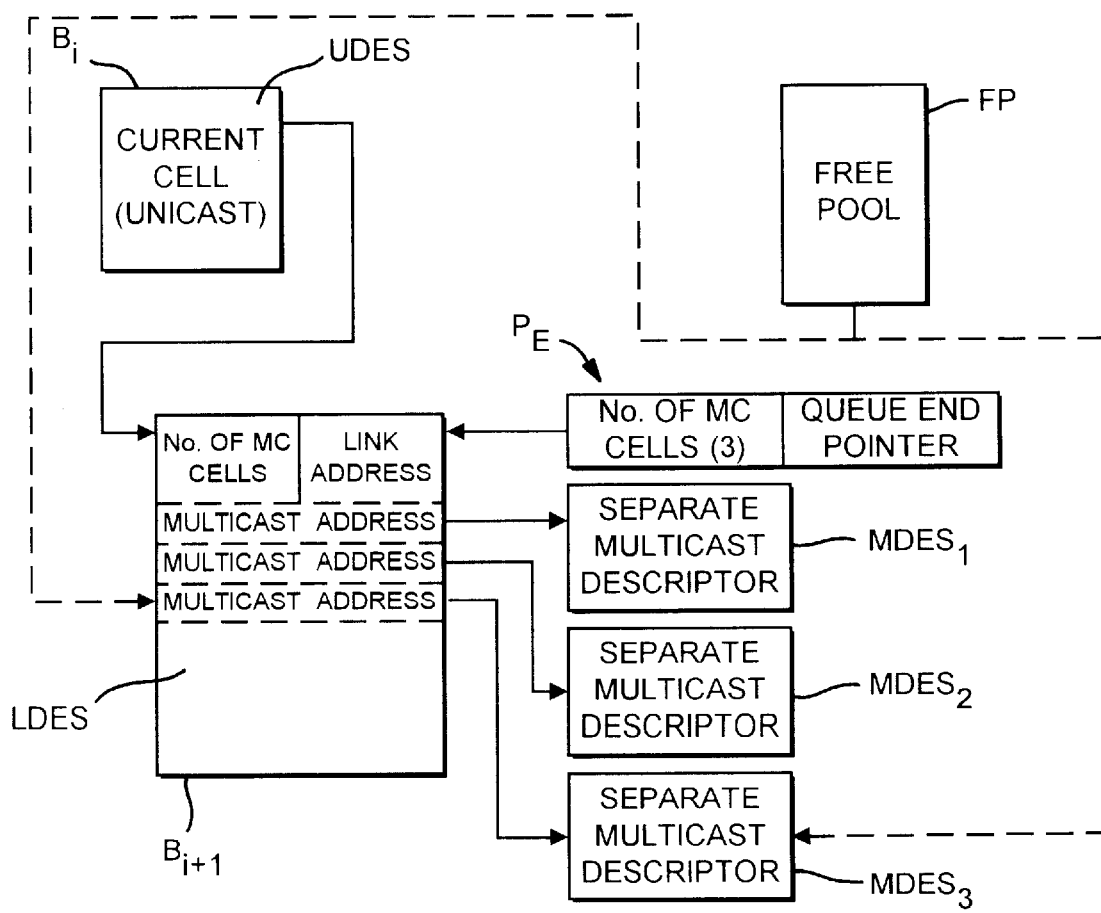

If further multicast cells destined for the same destination unit are received successively by the data unit 12 before another unicast cell for that destination data unit, then respective further multicast descriptors MDES are created, pointed to respectively by further successive multicast address fields of the link descriptor LDES. As no new descriptor is added to the receive queue itself, the queue end pointer $P_E$ only needs to be updated in respect of its "number of multicast cells" field, which, in the state shown in FIG. 10 in which two further multicast descriptors $MDES_2$ and $MDES_3$ have been stored, has the value 3.

The operation of writing a new multicast address in one of the multicast address fields of the link descriptor LDES requires only one memory access of the receive memory 24.

Thus, if the received multicast cell being processed was destined for ten destination data units, it would only take ten memory accesses to update the receive queues concerned.

Figure 11:
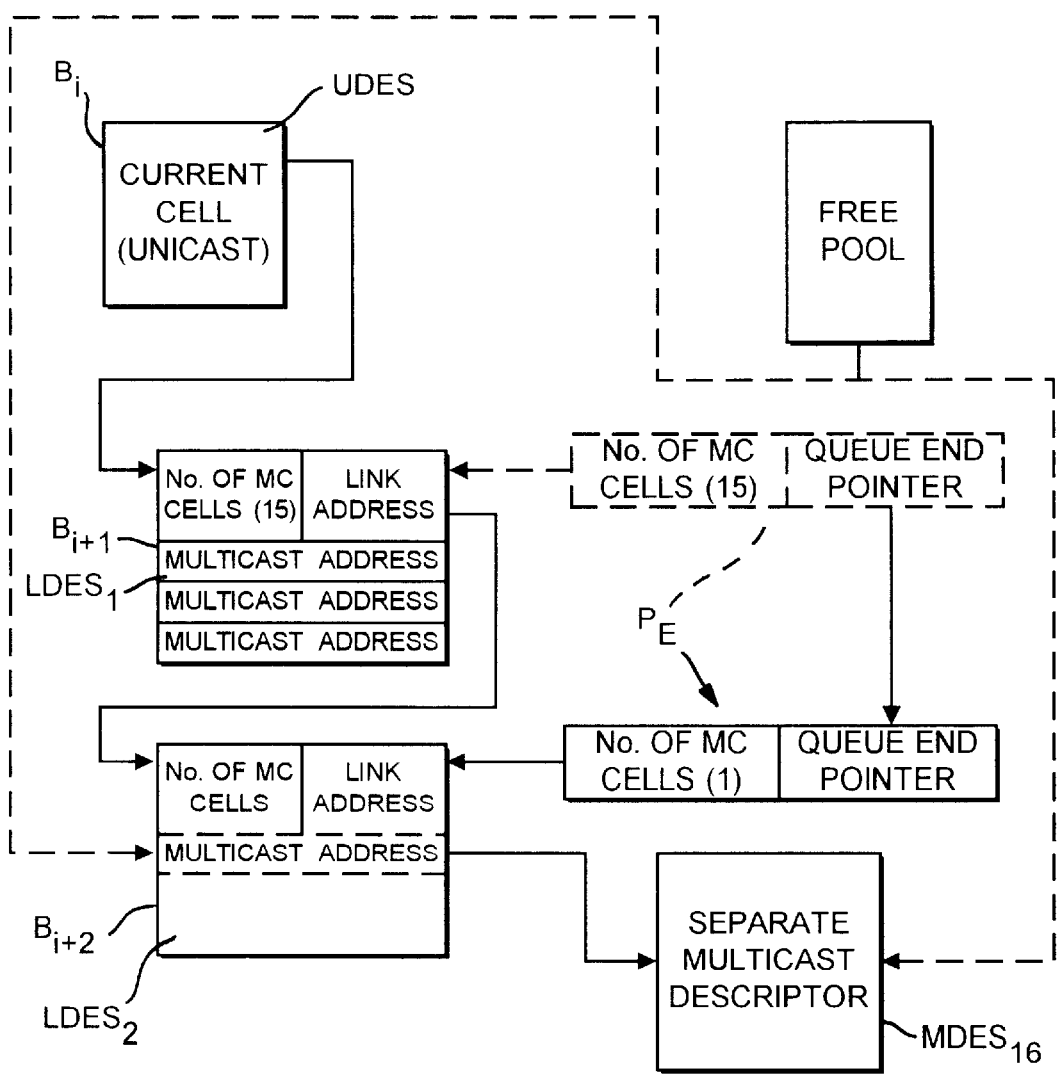

If there is a heavy volume of multicast traffic, it is possible that more than fifteen multicast cells will be received in succession for the same destination unit before the next unicast cell. In this case, processing proceeds as shown in FIG. 11. When the sixteenth consecutive multicast cell is received, a separate multicast descriptor $MDES_{16}$ is created for it, as before. However, the original link descriptor (now shown as $LDES_1$) is already full and accordingly it is not possible to store the address of the multicast descriptor $MDES_{16}$ for the new multicast cell in the link descriptor $LDES_1$. To deal with this situation, it is necessary to create a further link descriptor $LDES_2$, the address of which is taken from the free pool FP. In order to create the required link from the original link descriptor $LDES_1$ to the new link descriptor $LDES_2$, the address of the new link descriptor is stored in the link address field of the original link descriptor $LDES_1$, and the number of multicast cells field of the original link descriptor $LDES_1$ is set to fifteen based on the number of cells field of the queue end pointer $P_E$.

The queue end pointer $P_E$ is then updated to point to the address of the new link descriptor $LDES_2$, and the number of multicast cells field in the queue end pointer is set to one. The first multicast address field of the new link descriptor $LDES_2$ is used to store the address of the multicast descriptor $MDES_{16}$ for the new multicast cell.

Figure 12:
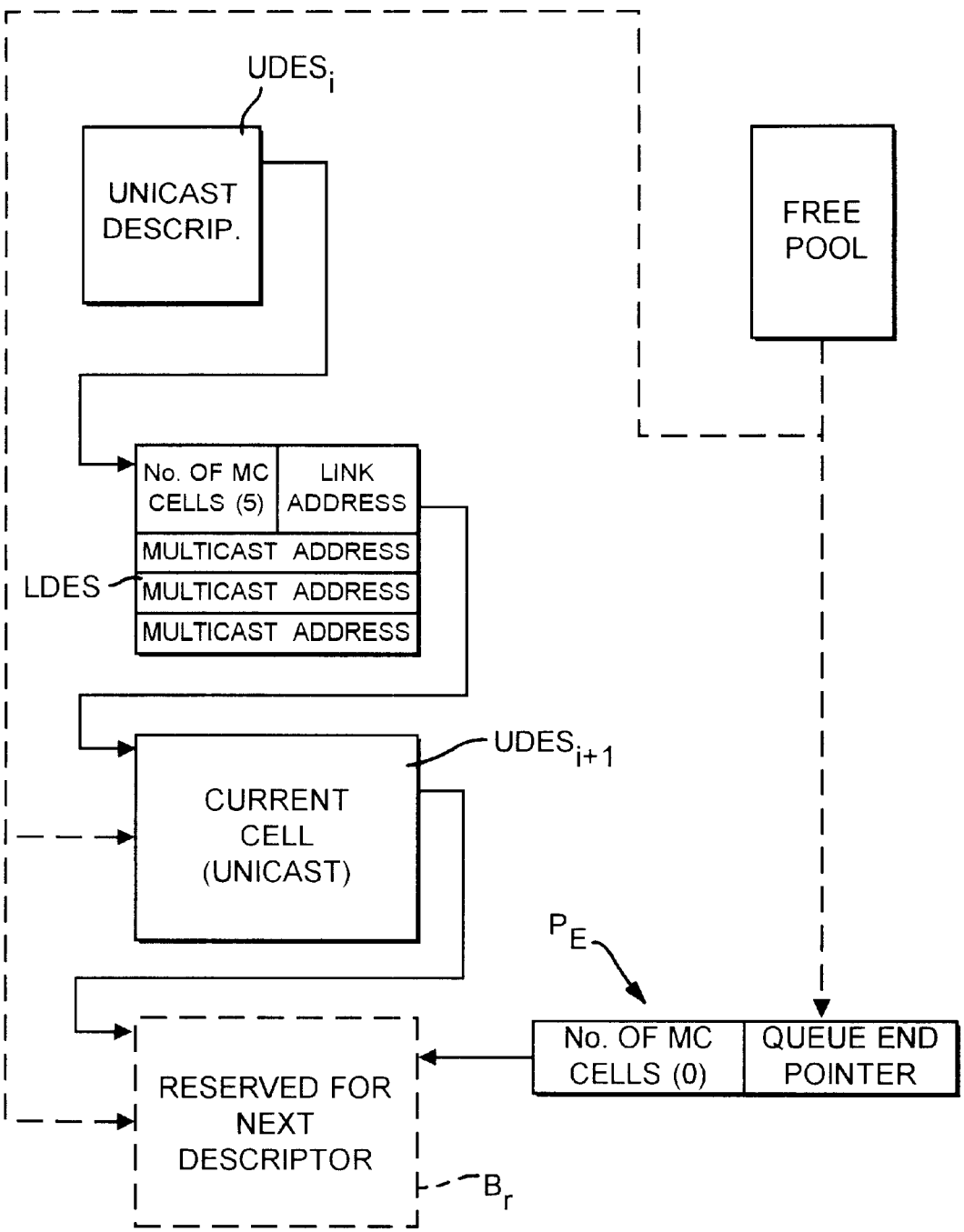

Finally, FIG. 12, shows what happens when, by way of example, after having received five consecutive multicast cells, a unicast cell is received in this embodiment. In this case, contrary to the situation described previously with reference to FIG. 4(B), there is no pre-reserved descriptor for the unicast cell. Thus, a new unicast descriptor $UDES_{i+1}$ is created for storing the unicast cell in the format shown in FIG. 8. The address of the new unicast descriptor $UDES_{i+1}$ is stored in the link address field of the link descriptor LDES, and the content of the number of multicast cells field of the queue end pointer $P_E$ is transferred to the number of multicast cells field of the link descriptor LDES.

A new data block $B_r$ is then reserved for the next cell to be received. The address of the reserved data block $B_r$ is stored in the queue end pointer $P_E$ and in the link address field of the new unicast descriptor $UDES_{i+1}$. The number of multicast cells field of the queue end pointer $P_E$ is reset to 0.

In this embodiment, the output section 150 and multicast handling section 148 read the descriptors from each receive queue in basically the same manner as described previously. The multicast processed bits $MPB_0$ to $MPB_{63}$ in the first two words of each multicast descriptor MDES are reset progressively to maintain the multicast descriptors until the last relevant receive queue requiring that multicast descriptor has been read.

This embodiment is particularly suitable in situations in which the volume of multicast traffic is significant as compared to the unicast traffic since it enables the entries for up to fifteen consecutive multicast cells to be made in the receive queue using a single link descriptor LDES. This makes the use of memory resources in the receive memory 24 highly efficient. Assuming (as will generally be the case) that the link descriptor does not overflow (requiring creation of a new link descriptor), only one memory access operation is required per destination data unit to store the address of the multicast descriptor in the first-available multicast address field of the link descriptor in the receive queue concerned. Furthermore, when the same link descriptor LDES is used to register successive multicast cells, only the number of multicast cells field of the queue end pointer $P_E$ needs to be updated (incremented), speeding up operation.

As noted previously, the multicasting process implemented by data units embodying the present invention is advantageously used in switching apparatus of the kind shown in FIG. 1 in which the data units operate synchronously under the control of a switching controller (20 in FIG. 1). In such apparatus, the particular receive queue RQ from which the output section 150 of each data unit is permitted to transfer data in each switching cycle can be determined by the switch controller 20 in such a way as to avoid contention of cells within the switching apparatus. Such contention could otherwise occur at an output port of one of the switching units (because two data-unit input portions 14 both wish to send data to the same data-unit output portion 16).

Because the switching controller 20 is able to determine the connections through the switch to avoid such contention problems, the "switching fabric" (provided by the switching unit 8 in FIG. 1) can be a simple cross-connect arrangement which does not require any buffering (apart, possibly, from cell pipeline buffers as explained hereinafter). This means that the switching fabric itself can be inexpensive.

The switching controller 20 has access to information relating to the receive queues $RQ_0$ to $RQ_{63}$ in the receive memory 24 of each data unit 12 and uses this information, in particular the queue fill levels and priorities, to identify any queues (or sub-queues, if provided) that are experiencing congestion in the switching apparatus, and, where appropriate, to change the control information registered in the input-portion local schedulers 150a so as to alleviate such congestion.

As well as designating the destination data unit for each source data unit in each switching cycle in this way, it is possible for the switching controller 20 also to supply control information to the switching unit 8 to set its configuration appropriately to provide the required connection from each source data unit to its destination data unit. This connection exists for the duration of the switching cycle concerned. Once the connections for use in a switching cycle have been established, the output section 150 of each source data unit reads a cell or cells (depending on the length of the switching cycle) from the queue for its designated destination data unit and transfers the cell(s) to the input port of the switching unit 8 to which it is connected. The entire cell (header and payload) is transferred. The rate of transfer is, for example, 622 Mbps (38.9 million 16-bit words per second). The header is transferred with the payload because the routing information carried by the header is needed by the destination data unit to determine the destination data port.

The data arriving at the input ports of the switching unit 8 is transferred to the appropriate output ports of the switching unit, again in accordance with the control information provided by the switching controller 20. From the output ports the data is received by the output portions 16 of the destination data units 12.

Referring again to FIG. 2, at the destination data unit 2 the received cell data is stored in a transmit memory 26 of the output portion 16. The cells are again stored in different queues, but in this case the queues correspond respectively to the two data ports $DP_x$ and $DP_{x+1}$ connected with the data unit. Thus, as shown in FIG. 2, the transmit memory 26 has a first transmit queue $TQ_x$ corresponding to the data port $DP_x$ and a second transmit queue $TQ_{x+1}$ corresponding to the data port $DP_{x+1}$. The identity of the destination data port $DP_x$ or $DP_{x+1}$ for each cell is established by the output portion 16 by using the routing information (cell address) carried by the cell to address another look-up table similar to the look-up table 144a in the input portion 14.

The transmit queues can again be sub-divided into sub-queues SQ in a number of different ways. For example, FIG. 2 shows the main transmit queue $TQ_x$ for the data port $DP_x$ divided into sub-queues $SQ_0$ to $SQ_3$ according to cell priority as was the case for the receive queues $RQ_0$ to $RQ_{63}$. As an alternative, FIG. 2 also shows the main transmit queue $TQ_{x+1}$ for the data port $DP_{x+1}$ divided into sub-queues $SQ_W$ to $SQ_Z$ corresponding respectively to the different virtual channels $VC_W$ to $VC_Z$ connected to that destination data port $DP_{x+1}$.

It will be appreciated that any suitable combinations of sub-queue types can be used in the transmit memory 26. It would also be possible simply to store the cells received from the switching unit 8 in the transmit memory 26 exclusively on a cell priority basis (i.e. not on a per data port basis).

Accordingly, it can be seen that in this example of switching apparatus employing the FIG. 2 data units 12, switching is effectively performed in two stages. In the first stage, cells received at the data ports are stored by the data-unit input portions 14 in their respective receive memories 24. Still at the first stage, these cells are transferred by the switching fabric to the relevant destination data-unit output portions 16 where they are stored in the respective transmit memories 26. The second-stage switching occurs when the cells are transferred from the transmit memories 26 to one of the data ports via one of the termination units 22 connected to the data unit 12 concerned.

In order to reduce congestion in the switching apparatus and allow more cells to reach their destination data units, it is advantageous for the output section 150 of each data unit 12 and the switching unit 8 to be capable of operating, at certain times, at a faster rate than the sum of the respective line rates (UNI line rates) of the data ports connected with the data units. For example, the output sections 150 and switching unit 8 could be capable of operating at double the sum of the UNI line rates. In this case the switching controller 20 can issue an instruction to increase the frequency at which the output sections 150 and switching unit 8 are clocked so that, for short periods of time, these components would operate at the above-mentioned faster rate. In this way, more opportunities can be provided to switch cells from source data units to destination data units. This is desirable since avoidance of contention in the switching fabric may mean that cells cannot be transferred from certain source data units in certain switching cycles. Operating the output sections and switching fabric components faster can therefore give a chance to "catch up".

In a similar manner, it may also be desirable to reduce the frequency at which the above-mentioned components are clocked to slow down the switching process to a rate below the sum of the UNI line rates so that the switching controller 20 can update the control information in the local schedulers 150a of the data-unit input portions 14.

It will be seen that the FIG. 2 data units are capable of implementing all the cell queues required in the switching apparatus as a whole. Thus, all the memory associated with the switching process is implemented in the same place, at each data unit, and is not distributed throughout the switching apparatus as in previous proposals.

The use of the switching controller to determine the source-destination paths in each switching cycle is advantageous in that in can assist in ensuring a fair allocation of switch resources and available bandwidth amongst the contending traffic sources. The switching controller can be relatively sophisticated in the way in which it determines the source-destination paths. For example, the switching controller could include a neural network or other adaptive learning means which could learn from previous experience how to predict and deal with future traffic flow situations. This would enable the switching controller to be proactive, predicting future traffic conditions and determining the best source-destination paths to deal with them, rather than simply reactive.

Other components suitable for use with the data unit 12 of FIG. 2 in switching apparatus will now be described in more detail with reference to FIGS. 13 to 17.

Figure 13:
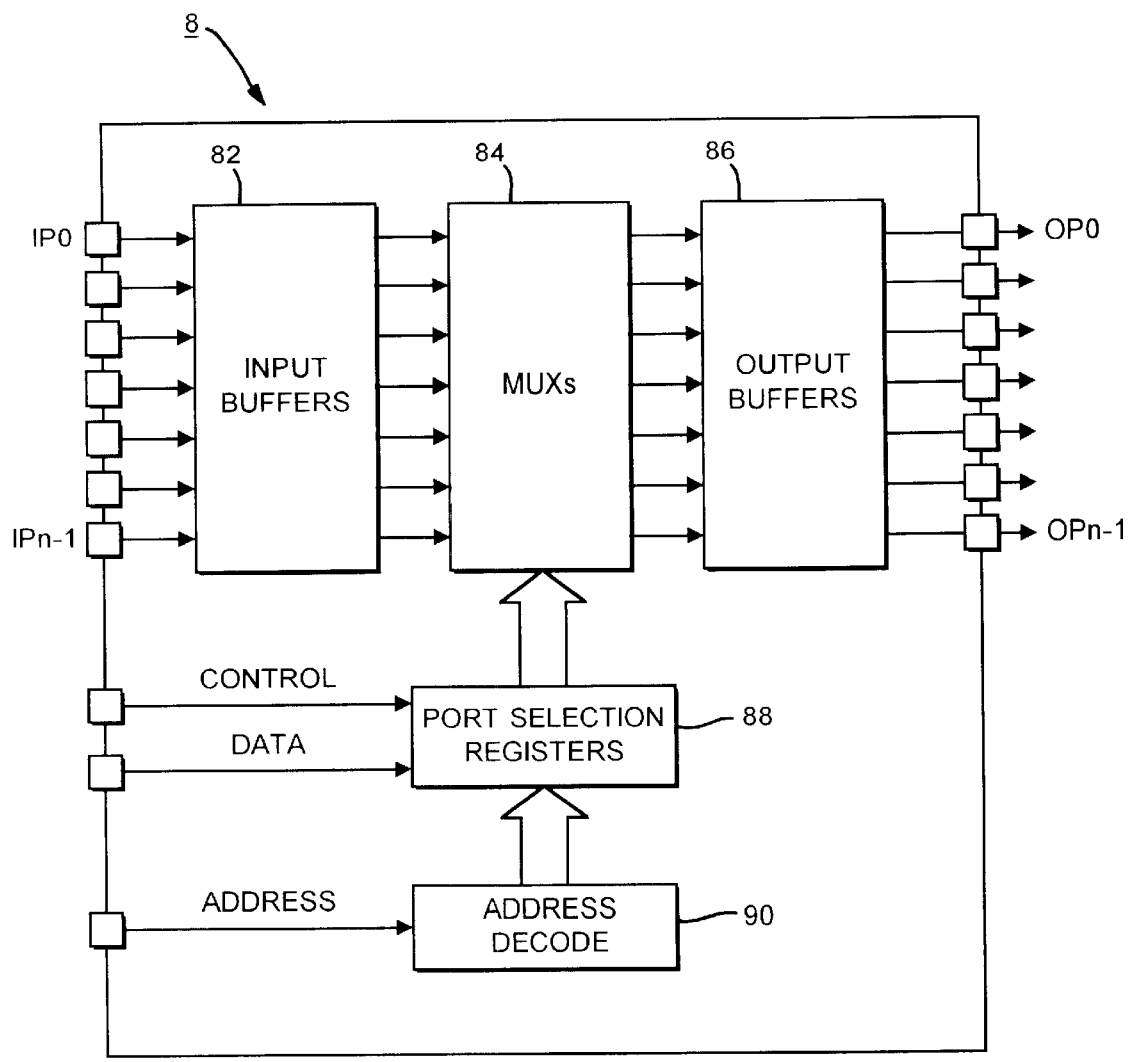
FIG. 13 shows a block circuit diagram of a cross-connect switching unit suitable for use with the FIG. 2 data unit.

FIG. 13 shows a block diagram of a switching unit 8 suitable for transferring data between the data units 12.

The switching unit 8 includes a set of input buffers 82, a set of multiplexers 84 and a set of output buffers 86. There is one input buffer 82, one multiplexer 84 and one output buffer 86 per input port IP of the unit. As mentioned previously, because all of the source-destination paths are determined for each switching cycle in advance and all cell queues are implemented in the data units, the input buffers 82 and output buffers 86 are not necessary to deal with output contention problems. However, the buffers 82 and 86 may advantageously be provided to buffer bytes/cells for pipelining/throughput/clock cycle reduction purposes. It is not envisaged the amount of memory required for these purposes would exceed one cell's worth of data.

The switching unit further comprises port selection registers 88 corresponding respectively to the multiplexers 84. An address decoder 90 is provided to control access to the registers 88.

Figure 14:
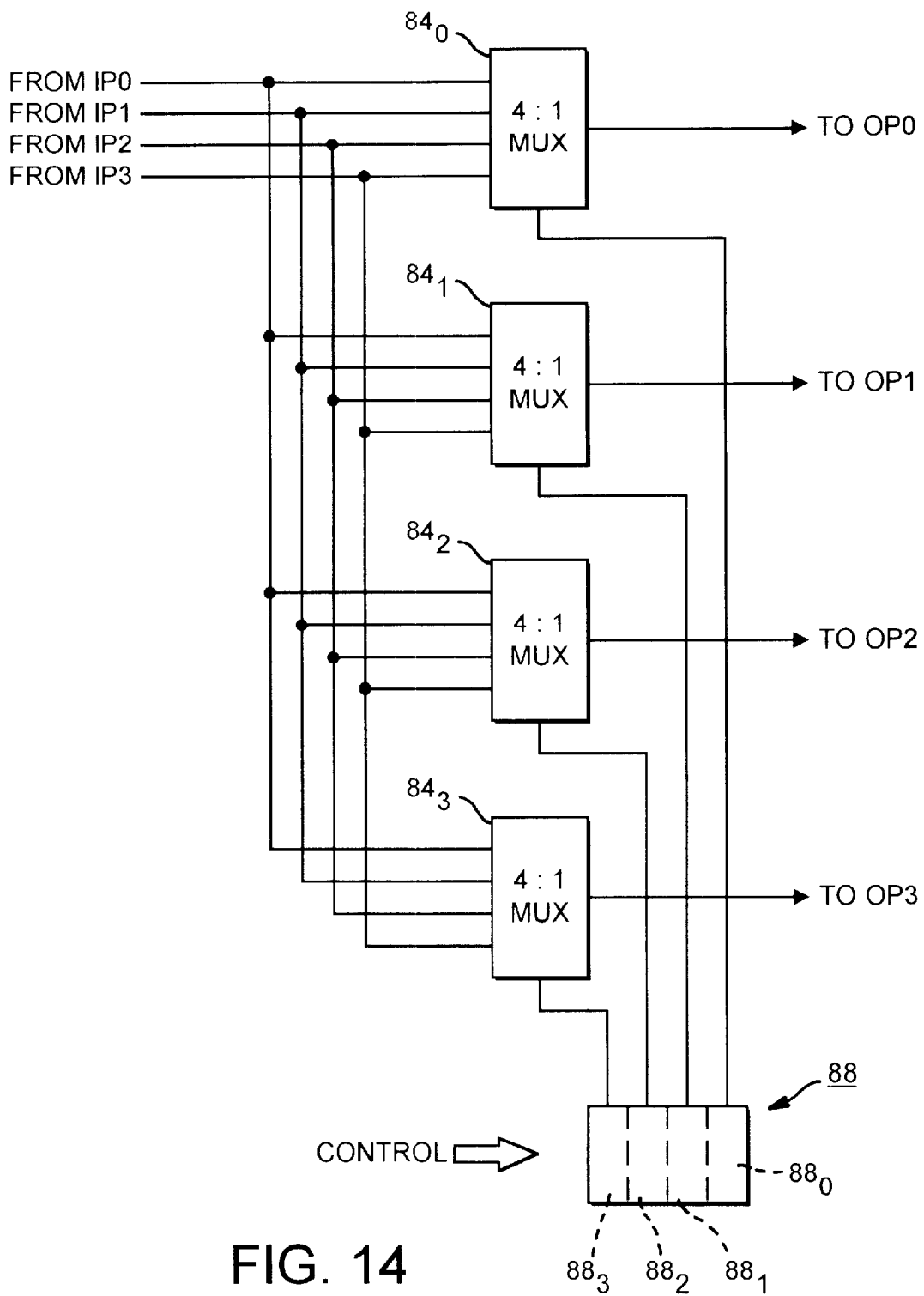
FIG. 14 shows in more detail parts of the FIG. 13 switching unit.

FIG. 14 shows the multiplexers 84 and port selection registers 88 in more detail. For the sake of simplicity, in FIG. 14 it is assumed that the switching unit has only four input ports $IP_0$ to $IP_3$ and four output ports $OP_0$ to $OP_3$. In this case there are four multiplexers $84_0$ to $84_3$, each having four inputs and a single output. The four input ports $IP_0$ to $IP_3$ of the switching unit are connected (via respective input buffers $82_0$ to $82_3$ not shown in FIG. 14) to the multiplexer inputs such that each of the four inputs of each multiplexer receives data from a different one of the input ports $IP_0$ to $IP_3$. The respective outputs of the multiplexers $84_0$ to $84_3$ are connected (via respective output buffers $86_0$ to $86_3$ also not shown in FIG. 14) to respective output ports $OP_0$ to $OP_3$ of the switching unit.

Each multiplexer $84_0$ to $84_3$ is connected to an associated port selection register $88_0$ to $88_3$. In accordance with control information stored in its associated port selection register 88, each multiplexer 84 connects one of its inputs to its output, thereby providing a data transfer path from one of the input ports IP of the switching unit 8 to one of the output ports OP of the switching unit.

Returning to FIG. 13, the control information stored in the port selection registers 88 can be changed by the switching controller 20 which first selects which port selection register 88 is to be updated, by supplying address information to the address decoder 90, and then supplies the appropriate new control information to the selected port selection register 88.

As described above, the switching controller 20 may control the switching unit directly to set up the required source-destination paths in each switching cycle. However, it is also possible for the switching unit to be controlled indirectly by the switching controller. This can be achieved by the source data units attaching to each cell that is to be transferred through the switching unit a routing tag specifying the cell's destination data unit, as described hereinbefore with reference to FIG. 6. In this case, the switching unit reads the routing tag information received with each cell as it passes through the unit, and hence the unit can be "self-routing"; in other words, the switching unit employs the routing tag information to establish the appropriate internal input port-output port connections.

Figure 15:
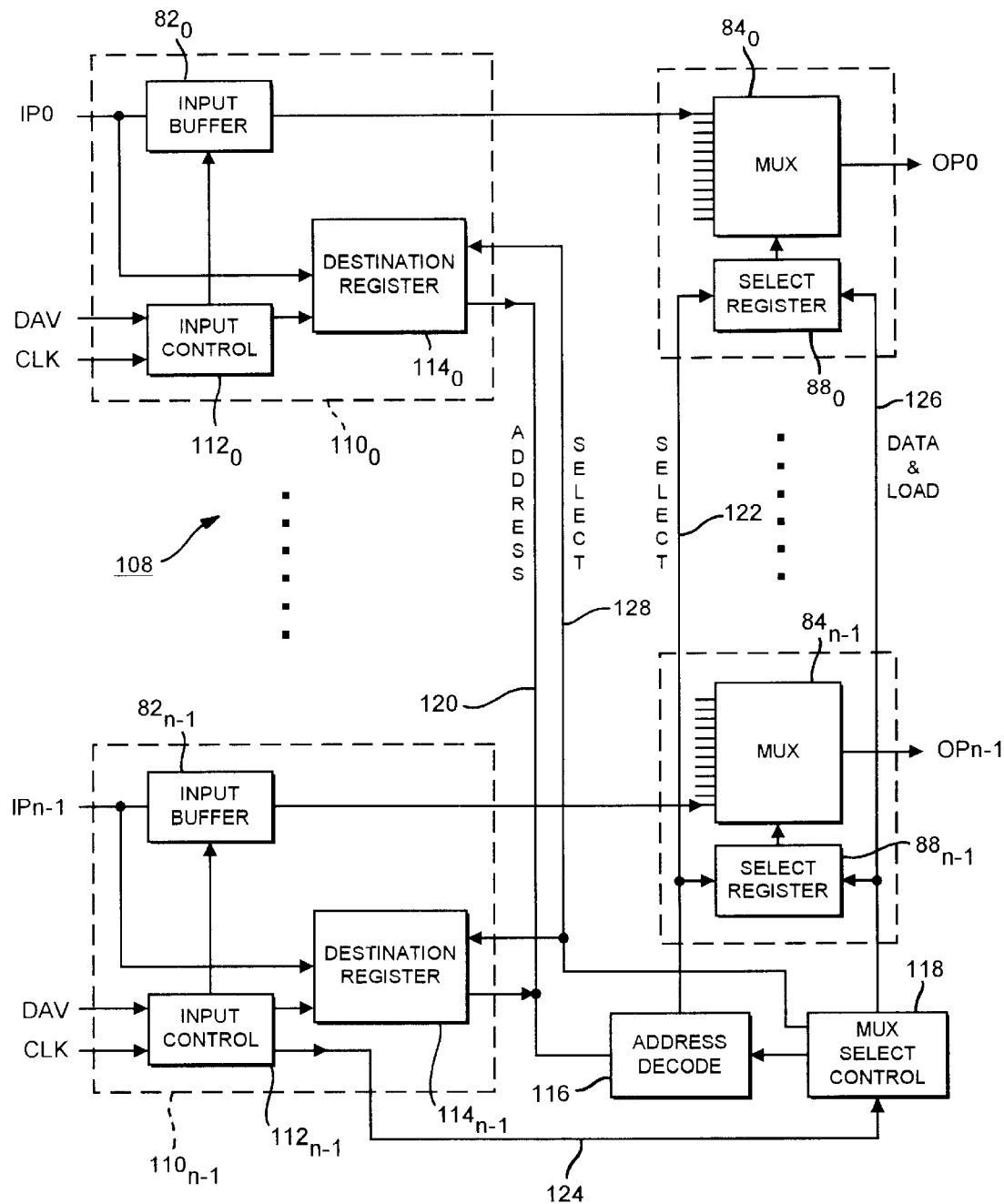
FIG. 15 shows a block diagram of a first cross-connect switching unit, embodying the aforesaid third aspect of the present invention and suitable for use with the FIG. 2 data unit.
Figure 16:
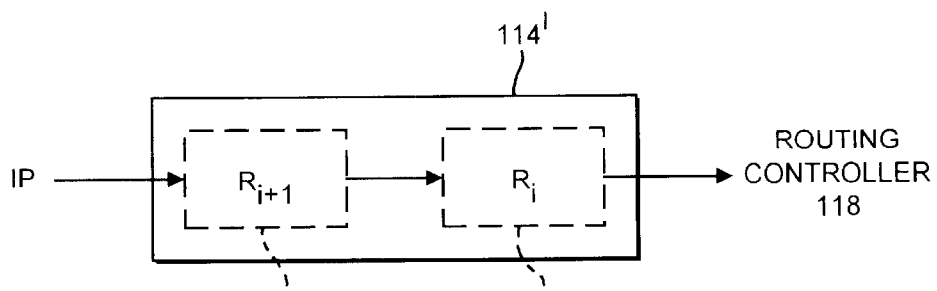
FIGS. 16(A) and 16(B) show schematic diagrams for use in explaining a modification to the FIG. 15 switching unit.
Figure 16:
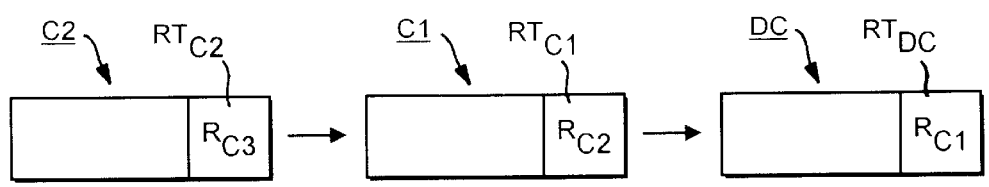

FIG. 15 shows a block diagram of parts of a cross-connect switching unit 108, embodying a second aspect of the present invention, which is self-routing in dependence upon routing tag information.

Components of the FIG. 15 self-routing switching unit 108 which are the same as, or correspond substantially to, components of the FIG. 13 switching unit 8 are denoted by the same reference numerals. Thus, as in the FIG. 13 switching unit, the FIG. 15 switching unit 108 has, for each of its n input ports, an input buffer 82, a multiplexer 84, an output buffer (not shown but similar to the output buffer 86 in FIG. 13) and a port selection register 88. Each input port $IP_0$ to $IP_{n-1}$ in FIG. 15, however, is further provided with a routing circuit $110_0$ to $110_{n-1}$. This routing circuit includes the input buffer 82 for the input port concerned, as well as an input controller 112 and a destination register 114.

The switching unit 108 further includes an address decoder 116 and a routing controller 118. The address decoder 116 is connected to each of the destination registers $114_0$ to $114_{n-1}$ by a routing information bus 120, and is also connected to each of the port selection registers $88_0$ to $88_{n-1}$ by a port selection register select bus 122. The routing controller 118 is connected to the input controller 112 of each routing circuit 110 (for the sake of clarity, only the connection to the input controller $112_{n-1}$ is shown in FIG. 15), and is also connected to each of the port selection registers $88_0$ to $88_{n-1}$ by data and control buses 126 and to each of the destination registers $114_0$ to $114_{n-1}$ by a destination register select bus 128. The routing controller 118 is also connected to the address decoder 116.

Operation of the FIG. 15 switching unit will now be described. It is again assumed that the switching apparatus in which the switching unit 108 is used is operating synchronously and performing a series of switching cycles. Each cell arriving at one of the input ports of the switching unit 108 has a routing tag attached to it.

When a cell with attached routing tag is received at an input port of the switching unit 108, the routing tag byte from the cell is stored in the destination select register 114 of the routing circuit 110 for that input port. This operation is performed in parallel for each input port, so that the respective routing tags of all the cells that will be transferred in the current switching cycle are stored in the destination registers $114_0$ to $114_{n-1}$ as soon as the first byte of the data packet (i.e. the routing tag byte) has been received.

As the remaining bytes of the data packet (i.e. the bytes of the cell itself) continue to be received they are stored in the input buffer 82 of the routing circuit 110. Whilst these bytes are being stored, the routing controller 118 reads each destination register $114_0$ to $114_{n-1}$ in turn, starting with destination register $114_0$ and finishing with destination register $114_{n-1}$.

The routing controller selects the destination register 114 to be read by transmitting select signals to the destination registers via the destination register select bus 128, and the routing tag information stored in the selected destination register is then delivered via the routing information bus 120 to the address decoder 116. The address decoder 116 converts the received routing tag information into a port selection register address which is delivered to all the port selection registers $88_n$ to $88_{n-1}$ via the port selection register select bus 122. This port selection register address designates one of the port selection registers $88_0$ to $88_{n-1}$ in accordance with the routing tag information. At the same time as the port selection register address is supplied to the port selection registers 88, the routing controller 118 supplies control information to those registers using the data and control bus 126. This control information specifies which of the n inputs of the multiplexer 84 controlled by the designated port selection register is to be selected, i.e. which multiplexer input is to be connected to the multiplexer output. As the n inputs to each multiplexer 84 are connected respectively to the n routing circuits $110_0$ to $110_{n-1}$, the required control information is simply the number of the particular routing circuit whose destination register has just been read. The routing controller 118 then applies a load signal to the port selection registers via the data and control bus 126 in response to which the port selection register designated by the port selection register address stores the control information. The other port selection registers do not store the control information.

If, for example, destination register $114_0$ in routing circuit $110_0$ for input port $IP_0$ contains "7" (i.e. the routing tag of the cell currently being received at the input port $IP_0$ specifies that the cell is to be routed to the destination data unit $12_7$), then the address decoder 116 produces a port selection address "7" designating the port selection register $88_7$ and the routing controller 118 outputs the control information "0" on the data and control bus 126 so that the port selection register $88_7$ for the output port of $OP_7$ stores the control information "0" corresponding to the currently-processed routing circuit $110_0$. In this way, a data transfer path is established from input port $IP_0$ to output port $OP_7$.

The routing controller 118 then reads the content of the destination register 1141 in the next routing circuit $110_1$ for input port $IP_1$. If the routing tag stored in this register specifies the destination data unit $12_x$, then the address decoder 116 designates the port selection register $88_x$ and writes the control information "1" into it, thereby establishing another data transfer path, from input port $IP_1$ to output port $OP_x$. This procedure is repeated until all of the input ports have been routed to their respective destination output ports.

As there are n inputs, the cell-routing process will take n+1 clock cycles. As there are 53 bytes in an ATM cell, provided that n<53 all of the input-output paths can be established before all of the bytes of the cell have been received at each input port.

As soon as the data transfer paths have been established by the routing controller 118, the cell data can start to be transferred from the input buffers $82_0$ to $82_{n-1}$ to the inputs of the multiplexers $84_0$ to $84_{n-1}$ This data is then transferred by each multiplexer $84_0$ to $84_{n-1}$ from the multiplexer input specified by the connected port select register $88_0$ to $88_{n-1}$ to the multiplexer output, and hence to the appropriate output port for the destination data unit.

It will be appreciated that, when the routing controller 118 operates in the manner described above, it is necessary for the input buffer 82 in each routing circuit 110 to have a capacity greater than one cell's worth of data. For example, it may be necessary for each input buffer to have a capacity equal to two cell's worth of data. However, the capacity of each of the input buffers should preferably be minimised in order to reduce the area occupied on the chip.

To overcome this problem, it is possible to employ a different cell-routing process in which the data transfer paths are established before the cells arrive. This is achieved by having each data unit use the routing tag of each cell $C_i$ to supply (feed forward) the routing information $R_{i+1}$ not for that cell $C_i$ but for the next cell $C_{i+1}$ that the data unit concerned will supply to the same switching-unit input port.

This feed-forward cell-routing process requires each of the destination registers $114_0$ to $114_{n-1}$ to be replaced by a "double-buffered" destination register 114', as shown in FIG. 16(A). This double-buffered destination register 114' comprises input and output registers 114a and 114b, the output register 114b holding the routing information Ri for the current cell $C_i$ whilst the routing information $R_{i+1}$ for the next cell $C_{i+1}$ is received by the input register 114a. Once all the data of the current cell has been transferred, the routing information for the next cell is transferred from the input register to the output register.

At the start of the cell-routing process (cf. FIG. 16(B)) the destination registers $114'_0$ to $114'_{n-1}$ for the input ports need to be initialised. This is achieved by each data unit 2 sending a dummy cell DC having an attached routing tag $RT_{DC}$, specifying the routing information $R_{C1}$ for the next cell (first actual data cell) C1 which that data unit will be transmitting to the same input port, and also having a null payload. This dummy DC cell could alternatively be a special initialisation cell. The routing information $R_{C1}$ carried by the dummy cell is received in the input register 114a of the double-buffered destination register 114' for the input port concerned. This routing information $R_{C1}$ is transferred immediately from the input register 114a to the output register 114b of the destination register concerned. These operations are carried out in parallel for all the input ports.

The routing controller 118 then reads all of the destination registers in turn (i.e. reads the output registers 114b) and stores the necessary information in the port selection registers $88_0$ to $88_{n-1}$ so as to establish the required data transfer paths before the first actual data cell C1 is received. Thus, as soon as the first actual data cell C1 is received it can start to be transferred to its intended output port.

The first data cell C1 carries in its routing tag $RT_{C1}$ the routing information $R_{C2}$ for the second data cell C2 and this information is stored in the input register 114a of the double-buffered destination register 114' whilst transfer of the data of the first data cell C1 is continuing. As soon as the output register 114b of each double-buffered destination register 114' has been read by the routing controller 118 the second-data-cell routing information $R_{C2}$ (received with the first data cell C1) is transferred from the input register 114a to the output register 114b of the destination register concerned. In this way, the required data transfer paths for the second set of data cells can be established as soon as transfer of the first set of data cells has been completed.

Figure 17:
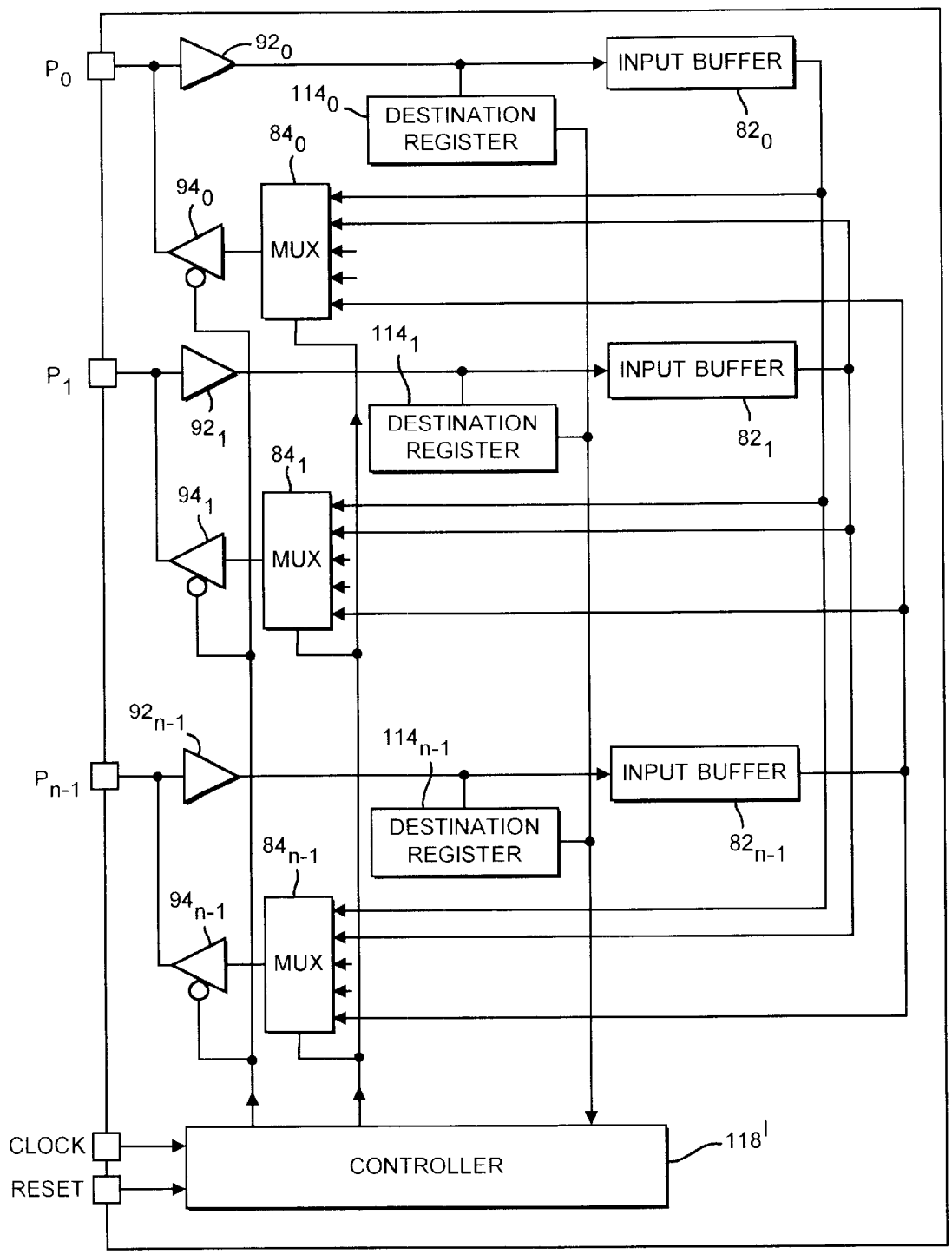
FIG. 17 shows a block diagram of a second cross-connect switching unit embodying the aforesaid third aspect of the present invention and suitable for use with the FIG. 2 data unit.

FIG. 17 shows a block diagram of part of another cross-connect switching unit 208 embodying the second aspect of the present invention which, like the cross-connect switching unit 108 of FIG. 15, is self-routing in dependence upon routing tag information. Components of the FIG. 17 self-routing switching unit 208 which are the same as, or correspond substantially to, components of the FIG. 15 switching unit 108 are denoted by the same reference numerals.

The switching unit 208 of FIG. 17 differs from the FIG. 15 switching unit 108 in that, instead of having separate input ports IP and output ports OP, the FIG. 17 switching unit only has bidirectional ports $P_0$ to $P_{n-1}$. Each bi-directional port P is connected via a buffer 92 to the input buffer 82 associated with that port and to the destination register 114 associated with that port. In addition, each multiplexer 84 is connected via a tri-state buffer 94 to one of the ports P.

The switching unit 208 further comprises a controller 118' which performs not only the function of the routing controller 118 in the FIG. 14 switching unit 108 but also an input/output control function.

The switching unit 208 in FIG. 17 operates in basically the same manner as the switching unit 108 of FIG. 15. However, when employed in switching apparatus, for example the FIG. 1 switching apparatus, the apparatus needs to have two phases (input and output phases) in each of its switching cycles. In the input phase the ports P of the switching unit 208 serve as input ports and each data-unit transfers a data packet (cell) to one of the ports P. These cells are stored internally in the input buffers $82_0$ to $82_{n-1}$ of the switching unit 208. The output port selections for these cells are made as the cells are written into the input buffers based on the routing information carried in the cell routing tags, as previously described. During this input phase of the switching cycle the controller 118' disables the tri-state buffers $94_0$ to $94_{n-1}$ so that the multiplexers $84_0$ to $84_{n-1}$ are isolated from the bi-directional ports $P_0$ to $P_{n-1}$.

Then, during the output phase of the switching cycle, the bidirectional ports P are employed as output ports and the cells are transferred from the input buffers $82_0$ to $82_{n-1}$ to their respective determined output ports P via the multiplexers $84_0$ to $84_{n-1}$ and the tri-state buffers $94_0$ to $94_{n-1}$ which at this time are enabled by the controller 118'.

It will be appreciated that, in order to provide the same data transfer rate as the FIG. 15 switching unit 108, the FIG. 17 switching unit 208 must be capable of operating at twice the sum of the respective line rates (UNI line rates) of the data ports connected with the data units 12. For example, if the sum of the UNI line rates is 622 Mbps, then the switching unit 208 would have to be operable at 1.2 Gbps.

The FIG. 17 switching unit 208 has the advantage over the switching unit 108 of FIG. 15 of having only half the total number of ports.

Of course the data units 12 of FIG. 2 can also be used with a switching unit which has bi-directional ports but which is not self-routing.

The multicasting method embodying the present invention, as described above, has particular advantages with self-routing components such as those shown in FIGS. 15 and 17 because it enables the design of these components, and of the data units themselves, to be kept desirably simple. In particular the routing tag format is the same for multicast cells as for unicast cells.

Figure 18:
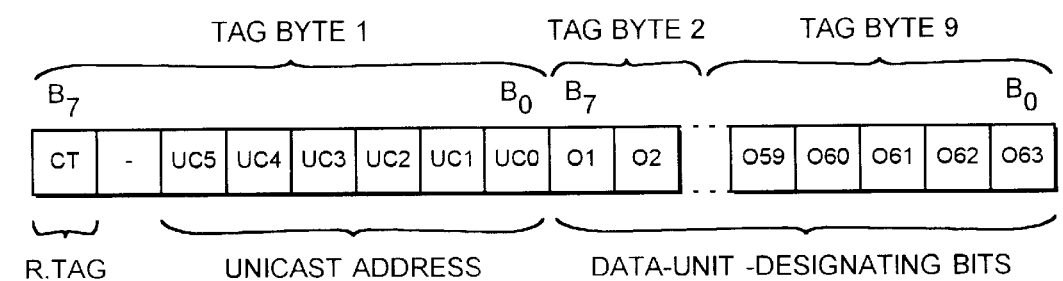
FIG. 18 shows a schematic diagram, corresponding to FIG. 6, of a routing tag used in a multicasting method not embodying the present invention.

If self-routing components were used with a dedicated multicasting cycle, in which one source data unit transfers a multicast cell to all the intended destination data units simultaneously, it would be necessary to adopt a different routing tag format from the one shown in FIG. 6. In this different routing tag format, one example of which is shown in FIG. 18, the routing tag is of variable length (one byte long or nine bytes long). The most-significant bit of the first byte is a cast-type bit CT indicating whether the cell to which the routing tag concerned is attached is to be unicast (i.e. sent to just a single destination data unit) or multicast (sent to a plurality of destination data units). If the cast-type bit CT is reset (0), this denotes a unicast cell and in this case the routing tag is only one byte in length. The lower-order six bits $UC_0$ to $UC_5$ of the single-byte routing tag specify the destination data unit for the unicast operation.

If, on the other hand, the cast-type bit CT is set (1) this denotes a multicast cell and the routing tag is nine bytes in length. The final eight bytes of the routing tag provide 64 data-unit-designating bits $O_0$ to $O_{63}$ corresponding respectively to the 64 different possible destination data units $12_0$ to $12_{63}$ in FIG. 1. Each of these bits designates, when set, that its corresponding destination data unit is to receive the multicast cell.

The switching fabric components can use the routing tag information to set their configurations appropriately both in the dedicated multicast cycles and in normal unicast cycles. However, the processing of the routing tag by the switching fabric components is complicated due to the complex format of the routing tag.

Furthermore, in the above-described method of implementing multicasting with self-routing cross-connect switches the data packet (routing tag and ATM cell data) is different in length when multicasting is occurring than when unicasting is being performed. This means that the multicast cycles will need to be of longer duration than other switching cycles used only for unicasting. In a multicasting method embodying the present invention, the routing tag can be of fixed length (e.g. one byte as in FIG. 6) so that there is no need to make provision for handling multicast cycles of variable duration longer than the unicast cycles.

As described above, a data unit/method embodying the present invention can implement multicasting in switching apparatus such as ATM switching apparatus and effectively removes the multicasting process from the switching fabric components, thereby enabling the design of the switching fabric components to be simplified and reducing the amounts of external memory required by the switching fabric components. Furthermore, the "multicasting groups", i.e. the destination data units to which a source destination unit can multicast, are not limited in a data unit embodying the present invention.

A data unit/method embodying the present invention is particularly suitable for use in switching apparatus in which the data units and the components of the switching fabric are fully controlled by a switching controller which determines the scheduling of cells for transfer via the switching fabric. As the switching fabric is essentially-memory-less, there can be no congestion in the switching fabric.

A data unit/method embodying the present invention is advantageously employed in switching apparatus having, in its switching fabric, a synchronous cross-connect switch. However, a data unit embodying the present invention is also applicable to other forms of switching apparatus which make use of destination/priority/traffic-class queues, for example memory-based switching apparatus including matrix, delta and Clos types.

Although the embodiments described above are intended for use in atm networks to switch atm cells, it will be appreciated that the present invention can be applied in other embodiments to any communications network in which the data is in the form of packets.

What I claim is:

1. A data unit, for receiving data packets and delivering them to packet switching circuitry, the received data packets including unicast packets belonging to just one of predetermined first and second categories of the data packets and also including multicast packets belonging to both said first and second categories, said data unit comprising:

a packet storage section to cause the received data packets to be stored in a memory;

a packet registration section having first and second registers to store entries, the packet registration section operating when each unicast data packet belonging to said first category is received, to make an entry corresponding to the packet concerned in a storage location of the first register and also operating when each unicast data packet belonging to said second category is received, to make an entry corresponding to the packet concerned in a storage location of the second register;

a multicast handling section operating when each said multicast packet belonging to both said first and second categories is received, to cause the packet registration section to make respective entries corresponding to the multicast packet concerned directly in respective storage locations of both the first and second registers; and a packet output section operating for each of said first and second registers, to read the entries in the register concerned in the order in which they were made and, for each entry read, to read out the corresponding data packet from the memory and output it to said packet switching circuitry;

wherein, within each register, each said entry is maintained in the storage location in which it was originally stored by said packet registration section when the corresponding packet was received until that packet is read out and output by said packet output section.

2. A data unit as claimed in claim 1, having a plurality of further predetermined categories of the data packets in addition to said first and second categories, and also having a plurality of further registers corresponding respectively to the plurality of further predetermined categories of the data packets;

said multicast handling section serving, when such a multicast packet is received, to cause the packet registration section to make such an entry corresponding to the packet concerned directly in the corresponding register for each category to which the packet belongs.

3. A data unit as claimed in claim 1, wherein the received data packets are categorized according to their respective intended destinations after being output by the packet output means, and each said register means corresponds to a different such intended destination.

4. A data unit as claimed in claim 1, wherein each said register means is in the form of a queue having a first-in first-out organization.

5. A data unit as claimed in claim 1, wherein each said multicast handling section operate when the received data packet is a multicast packet, to cause the packet storage section to store the multicast packet at a single location in said memory, and the entries corresponding to the multicast packet, made by the packet registration section in the register for each category to which the multicast packet belongs, each include a pointer to said single location.

6. A data unit as claimed in claim 1, wherein said memory and each said register forms part of the same storage unit.

7. A data unit as claimed in claim 6, wherein, for each data packet that is a unicast packet belonging to just one of said categories of data packets, said entry corresponding to that unicast packet includes at least some data of the packet itself.

8. A data unit as claimed in claim 6, wherein said packet storage section organizes said storage unit in data blocks and includes a free pool section, for registering in a free pool those data blocks of the storage unit that are free for use, the packet storage section operating when a data packet is received, to allocate the packet to one of said data blocks registered in said free pool; the data block allocated to such a unicast packet being re-registered by the free pool section when said entry corresponding to that packet has been read by the packet output section from the register in which the entry was made.

9. A data unit as claimed in claim 8, wherein said multicast handling section operates to inhibit the re-registration by the free pool section of a data block allocated to a multicast packet until each one of said entries corresponding to that multicast packet has been read by the packet output section.

10. A data unit as claimed in claim 9, wherein:
data of said multicast packet is stored in a multicast descriptor in the data block allocated to the packet, which multicast descriptor includes multicast processed bits corresponding respectively to the different categories of data packets; and
said multicast handling section operates when such a multicast packet is received, to preset to a first state the multicast processed bits corresponding respectively to the categories to which the multicast packet concerned belongs, whilst presetting the remaining multicast processed bits to a second state different from said first state, and also operating when the entry corresponding to the multicast packet in one of the registers is read by the packet output section, to change the multicast processed bit corresponding to that register to said second state, and to cause the data block allocated to the multicast packet to be returned to said free pool upon detecting that all of said multicast processed bits have said second state.

11. A data unit as claimed in claim 8, wherein each of the entries corresponding to a multicast packet is made in a link descriptor stored in one of said data blocks, and the entries corresponding respectively to at least two successive multicast packets received between two successive unicast packets can be stored in the same link descriptor.

12. A data unit as claimed in claim 1, wherein the received data packets are sub-categorized according to their respective priorities, and the register for at least one category is sub-divided into a plurality of sub-registers corresponding respectively to the different priority-sub-categories, the packet registration section operating when a data packet belonging to said one category is received, to make said entry corresponding to the data packet in that one of said sub-registers which corresponds to the priority-sub-category to which the packet concerned belongs.

13. A data unit as claimed in claim 12, wherein the packet output section operates to select the sub-registers in priority order and, for each selected sub-register, to output the data packets whose respective corresponding entries are in the sub-register concerned in the order in which those entries were made.

14. A data unit as claimed in claim 3, wherein said packet output section operates to attach a routing tag to each data packet output thereby, which routing tag includes information identifying said intended destination of the packet.

15. A data unit as claimed in claim 14, wherein said routing tag is of fixed length.

16. A data unit as claimed in claim 3, wherein the packet output section operates to attach to each data packet output thereby a routing tag including information identifying said intended destination of the next data packet to be output thereby.

17. A data unit as claimed in claim 16, wherein said routing tag is of fixed length.

18. A data unit as claimed in claim 1, wherein said data packets each comprise one or more ATM cells.

19. A data unit as claimed in claim 18, wherein:
the received data packets are categorized according to their respective intended destinations after being output by the packet output section, and each said register corresponds to a different such intended destination; and
said packet output section is operable, when an entry corresponding to such a multicast packet is read from the register corresponding to one of said intended destinations of the packet, to include, in the header portion of each ATM cell of the packet output thereby, routing information corresponding to that intended destination.

20. Switching apparatus including:
a plurality of data units, each for receiving data packets and delivering them to packet switching circuitry, the received data packets including unicast packets belonging to just one of predetermined first and second categories of the data packets and also including multicast packets belonging to both said first and second categories, each of said data units comprising:
a packet storage section for causing the received data packets to be stored in a memory;
a packet registration section having first and second registers to store entries, the packet registration section operating when each unicast data packet belonging to said first category is received, to make an entry corresponding to the packet concerned in a storage location of the first register and also operating when each unicast data packet belonging to said second category is received, to make an entry corresponding to the packet concerned in a storage location of the second register;
a multicast handling section operating when each said multicast packet belonging to both said first and second categories is received, to cause the packet registration section to make respective entries corresponding to the multicast packet concerned in respective storage locations of both the first and second registers; and
a packet output section operating for each of said first and second registers, to read the entries in the register section concerned in the order in which they were made and, for each entry read, to read out the corresponding data packet from the memory and output it to said packet switching circuitry;
wherein, within each register, each said entry is maintained in the storage location in which it was originally stored by said packet registration section when the corresponding packet was received until the packet is read out and output by said packet output section; and
a switch connected to said packet output section of each of said data units for receiving data packets output by the data unit concerned and transferring them to a selected further one of the data units.

21. Switching apparatus as claimed in claim 20, wherein said data units and said switch operate synchronously to perform a series of switching cycles, and the apparatus further comprises switching controllers connected with said data units for selecting the register of each data unit from which one of said entries is to be read by the output section of the unit concerned in each switching cycle.

22. Switching apparatus as claimed in claim 20, wherein said switch comprises a cross-connect switching unit.

23. A method of multicasting data packets, for use in a data unit of packet switching apparatus, which method comprises:

receiving data packets at the data unit and storing them in a memory, the received data packets including unicast packets belonging to just one of predetermined first and second categories of the data packets and also including multicast packets belonging to both said first and second categories;

when each unicast data packet belonging to said first category is received, making an entry corresponding to the packet concerned in a storage location of a first register and, when each unicast data packet belonging to said second category of the data packets is received, making an entry corresponding to the packet concerned in a storage location of a second register, and when each said multicast packet belonging to both said first and second categories is received, making respective entries corresponding to the multicast packet concerned in respective storage locations of both the first and second registers; and for each of said first and second registers, reading the entries in the register concerned in the order in which they were made and, for each entry read, reading out the corresponding data packet from the memory and outputting it from the data unit to said packet switching apparatus;

wherein, within each register, each said entry is maintained in the storage location in which it was originally stored when the corresponding packet was received until that packet is read out from said memory and output.

24. A data unit, for receiving data packets and delivering them to packet switching circuitry, the received data packets including unicast packets belonging to just one of predetermined first and second categories of the data packets and also including multicast packets belonging to both said first and second categories, said data unit comprising:

a packet storage section to cause the received data packets to be stored in a memory;

a packet registration section operating when each unicast data packet belonging to said first category is received, to make an entry corresponding to the packet concerned in a first register and also operating when each unicast data packet belonging to said second category is received, to make an entry corresponding to the packet concerned in a second register;

a multicast handling section operating when each said multicast packet belonging to both said first and second categories is received, to cause the packet registration section to make respective entries corresponding to the multicast packet concerned in both the first and second registers; and a packet output section operating for each of said first and second registers, to read the entries in the register concerned in the order in which they were made and, for each entry read, to read out the corresponding data packet from the memory and output it to said packet switching circuitry;

wherein:

for each said multicast packet, the entries are made directly in the first and second registers when the packet is received; and within each said register, the entries made are all stored in the same memory device.

25. A data unit for use in a device having a memory, a plurality of output ports and a plurality of registers corresponding respectively to the output ports, comprising:

a packet storage section to store received packets in the memory;

a packet registration section operating when each unicast packet destined for a single output port is received, to make an entry for the unicast packet in the corresponding register;

a multicast handling section operating when each multicast packet destined for a plurality of output ports is received, to make a plurality of entries in the respective registers corresponding to the output ports; and a packet output section to read the entries in the registers, and output the corresponding packets from the memory to the output ports corresponding to the read registers such that for each register, the entries are read in the order in which they were made in the register, the entries being maintained at their original storage locations within the registers until the corresponding packet is output to the respective output port.

26. A data unit, for receiving data packets and delivering them to packet switching circuitry, the received data packets including unicast packets belonging to just one of predetermined first and second categories of the data packets and also including multicast packets belonging to both said first and second categories, said data unit comprising:

packet storage means for causing the received data packets to be stored in memory means;

packet registration means having first and second register means to store entries, the packet registration means operating when each unicast data packet belonging to said first category is received, to make an entry corresponding to the packet concerned in a storage location of the first register means and also operating when each unicast data packet belonging to said second category is received, to make an entry corresponding to the packet concerned in a storage location of the second register means;

multicast handling means operating when each said multicast packet belonging to both said first and second categories is received, to cause the packet registration means to make respective entries corresponding to the multicast packet concerned directly in respective storage locations of both the first and second register means; and packet output means operating for each of said first and second register means, to read the entries in the register means concerned in the order in which they were made and, for each entry read, to read out the corresponding data packet from the memory means and output it to said packet switching circuitry;

wherein, within each register means, each said entry is maintained in the storage location in which it was originally stored by said packet registration means when the corresponding packet was received until that packet is read out and output by said packet output means.

* * * * *

UNITED STATES PATENT AND TRADEMARK OFFICE
CERTIFICATE OF CORRECTION

PATENT NO.    : 6,349,097 B1
DATED         : February 19, 2002
INVENTOR(S)   : Graeme Roy Smith It is certified that error appears in the above-identified patent and that said Letters Patent is hereby corrected as shown below:

<u>Title page,</u>
Item [30], Foreign Application Priority Data, change "9617100"
to -- 9617100.4 --.

<u>Column 24,</u>
Line 45, change "means" (first occurrence) to -- section --.
Line 45, delete "means" (second occurrence).
Line 48, delete "means".

Signed and Sealed this

Eighteenth Day of June, 2002

*Attest:*

JAMES E. ROGAN
*Attesting Officer*  *Director of the United States Patent and Trademark Office*